United States Patent [19]
Kananen et al.

[11] Patent Number: 6,029,394
[45] Date of Patent: *Feb. 29, 2000

[54] MUSHROOM SPAWN-SUPPLEMENT

[75] Inventors: David L. Kananen, McClure; Randy Funchion, Napoleon; Dena Lapolt, Bowling Green, all of Ohio; Jack A. McDaniel, Macungie, Pa.

[73] Assignee: Vlasic Farms, Inc., Cherry Hill, N.J.

[ * ] Notice: This patent is subject to a terminal disclaimer.

[21] Appl. No.: 09/027,216

[22] Filed: Feb. 20, 1998

[51] Int. Cl.[7] .............................. A01H 15/00; A01G 1/04
[52] U.S. Cl. .................................................................. 47/1.1
[58] Field of Search ................................................... 47/1.1

[56] References Cited

U.S. PATENT DOCUMENTS

| | | | |
|---|---|---|---|
| 3,560,190 | 2/1971 | Hughes et al. | 71/5 |
| 3,828,470 | 8/1974 | Stoller | 47/1.4 |
| 3,942,969 | 3/1976 | Carroll, Jr. et al. | 71/5 |
| 4,079,543 | 3/1978 | Stoller | 47/1.1 |
| 4,170,842 | 10/1979 | Stoller | 47/1.1 |
| 4,534,781 | 8/1985 | Wu et al. | 71/5 |
| 4,617,047 | 10/1986 | Bretzloff | 71/5 |
| 4,764,199 | 8/1988 | Pratt et al. | 71/5 |
| 4,776,872 | 10/1988 | Mulleavy et al. | 71/5 |
| 4,803,800 | 2/1989 | Romaine et al. | 47/1.1 |
| 4,848,026 | 7/1989 | Dunn-Coleman et al. | 47/1.1 |
| 4,874,419 | 10/1989 | Wu | 71/5 |
| 4,990,173 | 2/1991 | Katz et al. | 71/5 |
| 5,370,714 | 12/1994 | Ogawa et al. | 47/1.1 |
| 5,443,612 | 8/1995 | Havens | 71/5 |
| 5,472,592 | 6/1995 | Romaine et al. | 47/1.1 |
| 5,503,647 | 4/1996 | Dahlberg et al. | 47/1.1 |
| 5,759,223 | 6/1998 | Carlson et al. | 71/5 |

FOREIGN PATENT DOCUMENTS

| 0 700 884 | 3/1996 | European Pat. Off. | C05F 11/02 |

OTHER PUBLICATIONS

Kisarov, SU 1242050A, issued Jul. 7, 1986, Derwent, ACC # 1987–063121.

Chang et al. (Ed), 1978. The Biology and Cultivation of Edible Mushrooms, Academic Press, pp. 245–246, and 248.

*Primary Examiner*—David T. Fox
*Assistant Examiner*—Anne Marie Grünberg
*Attorney, Agent, or Firm*—Banner & Witcoff, Ltd.

[57] ABSTRACT

A mushroom spawn-supplement comprising a mixture of: (a) at least one proteinaceous ingredient in an amount to provide at least 3.5% nitrogen on a dry weight basis; (b) 2 to 30 wt % based on dry weight of paper pellets (c) 5 to 60 wt % based on dry weight of at least one particulate material, (d) a buffer in an amount effective to provide a pH of about 6 to 7.8, and (e) water; and colonized with *Agaricus bisporus* mycelium.

33 Claims, 7 Drawing Sheets

MUSHROOM SPAWN-SUPPLEMENT

TECHNICAL FIELD

The present invention relates to the art of mushroom cultivation and specifically pertains to an improved mushroom spawn-supplement that efficiently inoculates the mushroom substrate and provides an improved nutrient source for promoting mushroom growth.

BACKGROUND OF THE INVENTION

The commercial production of mushrooms (*Agaricus bisporus*) involves a series of steps, including compost preparation, compost pasteurization, inoculating the compost with the mushroom fungus (spawning), incubation to allow thorough colonization of the compost with mushroom mycelia, top dressing the compost with moistened peat moss (casing), and controlling the environment to promote the development of mature mushrooms. The mushroom growing process is described in detail in several publications (for example, Chang & Hayes, 1978; Flegg et al., 1985; Chang & Miles, 1989; Van Griensven, 1988).

Mushroom spawn is used to inoculate the nutritive substrate (compost). Virtually all spawn now used is based on a grain substrate. The technology for making grain based mushroom spawn was first taught by Sinden (U.S. Pat. No. 1,869,517). Spawn is generally made from sterilized grain that is inoculated with pure cultures of the desired mushroom strain. Mushroom spawn can be prepared by several methods. In one method, dry grain (rye, millet, wheat, sorghum, or other grain), water, $CaCO_3$, and (optionally) $CaSO_4$ are placed in suitable containers and capped with lids that allow passage of air and steam but do not allow the passage of microbes that would contaminate the finished product. Containers are subject to steam sterilization for times and temperatures suitable to render the mixtures commercially sterile. Following cooling, the grain mixture is inoculated with a starter culture of the desired mushroom strain, and incubated under permissive conditions for approximately 14 days. Containers are shaken at specific intervals to promote even colonization of the mycelium throughout the mixture. Following complete colonization of the hydrated, sterile grain with the mushroom fungus, the spawn can be used immediately to inoculate mushroom compost. The mixtures can also be transferred to plastic bags and refrigerated in anticipation of spawning at a future date.

Spawn properly prepared according to the above cited method has the following characteristics: Approximately 48 to 50 wt % moisture, pH 6.6 to 7.2, free flowing, even white color resulting from the heavy growth of the *Agaricus bisporus* mycelium. Spawn is generally added to mushroom compost at a rate of 2–4% (fresh weight spawn/dry weight compost). Since rye spawn contains about 1.15% nitrogen (Kjeldahl) on a fresh weight basis (about 2.3% on a dry weight basis), and also contains carbohydrate and lipid, spawn contributes some nutrients to the mushroom substrate.

Properly prepared mushroom spawn is resistant to contamination by foreign microorganisms. The heavy growth of the mushroom mycelium on the grain particles excludes the growth of many competitor microorganisms. Even when spawn is added to mushroom compost, which contains high levels of bacteria and molds, properly prepared spawn does not show overt growth of foreign microorganisms (Elliott, 1985). This is in part due to the exclusionary effect of the heavy growth of the *Agaricus bisporus* mycelium and in part due to the "selectivity" of properly prepared mushroom compost.

An alternate method of spawn production involves bulk cooking of grain in large kettles. Grain and water mixtures are heated to hydrate the grain. After draining excess water, the hydrated grain is mixed with $CaCO_3$ and $CaSO_4$, filled into bottles or heat resistant plastic bags, sterilized, cooled, inoculated with starter cultures of the desired mushroom strain, and incubated to allow colonization of the grain with the mycelium.

Another method of spawn production involves placing grain, water, $CaCO_3$, and $CaSO_4$ into steam jacketed mixers. Mixtures are cooked, sterilized, cooled, and inoculated in the mixers. The inoculated sterile grain is aseptically transferred to sterile plastic bags that are ventilated to allow passage of air while maintaining sterility. Following mycelial growth, spawn can be shipped to mushroom production facilities with minimal further handling of the product.

Virtually all spawn used to inoculate mushroom compost is made using rye, millet, wheat, sorghum, or other grain substrate. Fritsche (1978) describes a formula reported by Lemke (1971) for spawn on a perlite substrate. The formula is as follows: perlite (1450 g), wheat bran (1650 g), $CaSO_4.2 H_2O$ (200 g), $CaCO_3$ (50 g), water (6650 ml). The pH after sterilization is 6.2 to 6.4. This formula is calculated to contain 1.10 to 1.34% nitrogen on a dry weight basis (assuming a typical nitrogen content of wheat bran of 2.24 to 2.72%).

Stoller (U.S. Pat. No. 3,828,470) teaches that mushroom mycelium will not grow on feedstuffs such as cottonseed meal, soybean meal, etc., when used alone as an autoclaved substrate. Stoller also teaches spawn in which the cereal substrate has been diluted with an inorganic material containing calcium carbonate or an organic flocculating agent. Nitrogen contents are generally low. For example, Stoller's example 16 is estimated to contain about 0.22% nitrogen. Stoller's example 18 is estimated to contain about 0.7% nitrogen. Stoller also teaches that a fine, granular or powdery spawn is preferable to the large, whole grain particles of grain spawn. This is generally due to the number of "points of inoculum" per unit weight of spawn.

Romaine (U.S. Pat. No. 4,803,800) teaches production of mushroom casing spawn by encapsulation of nutrients in a hydrogel polymer. Casing spawn is used to inoculate the mushroom casing layer rather than the compost. Use of casing spawn speeds fruiting. Nitrogen contents in the Romaine casing spawn are generally low. For example, Romaine teaches total nutrient levels of 2 to 6% (wt/vol of formula). Assuming the use of 100% protein as the nutrient source, total nitrogen would be about 0.96%. Some of Romaine's formulas contain perlite, vermiculite, soy grits, or similar materials at about 2 to 6% (wt/vol) of the formula as texturizing agents.

Dahlberg & LaPolt (U.S. Pat. No. 5,503,647) teach the development of a mushroom casing spawn prepared from nutritionally inert particles (calcined earth, vermiculite, perlite, etc) amended with nutrients. The casing spawn is formulated with low nitrogen contents (generally less than 1%) to allow inoculation of the mushroom casing layer with *Agaricus bisporus* mycelium without promoting the growth of pests and pathogens. Dahlberg & LaPolt also teach that high levels of proteinaceous ingredients such as soybean fines, etc. are inhibitory to *Agaricus bisporus* growth. Generally, nitrogen levels above about 2% in a casing spawn formula result in reduced growth of *Agaricus bisporus* mycelium. This casing spawn formulation is also proposed as a substrate for inoculation of spawn during its preparation.

Mushroom Supplements:

Many mushroom growers add nutrient supplements to the mushroom compost at the time of spawning or casing. Because of the danger of spreading diseases, especially at tray-type mushroom farms, most mushroom growers add supplements at spawning. Addition of such supplements usually results in an increase in mushroom yield. Nutrient supplements generally consist of proteinaceous materials such as cracked soybean particles, soybean meal, corn gluten, feather meal, and similar materials. For example, in Hughes et al. (U.S. Pat. No. 3,560,190), a dry formulation based on a combination of cottonseed meal and cottonseed oil is disclosed as a suitable supplement.

Nutrient supplementation, however, is susceptible to some undesirable effects. One problem that has been encountered is excessive bed heating, apparently caused by the ready availability of the nutrient source to the highly active microbial mushroom culture. Temperature excursions above 35° C. (95° F.), sufficient to significantly deplete, if not completely destroy the mushroom mycelia have been observed. Another problem is encountered when adding the supplement to the compost at the time of spawning. In many cases, other microorganisms, primarily molds, preexisting in the compost, introduced with the supplement, or introduced via airborne contamination, compete with the mushroom mycelium for the added nutrients. This reduces the availability of the supplement for its intended purpose, and often hinders the development of the mushroom mycelium.

Recognizing these problems, Carroll et al. (U.S. Pat. No. 3,942,969) provides a supplement suitable for addition to the compost at the time of spawning, in which the release of the nutrient is delayed. The supplement comprises a denatured protein source, including protein derived from cottonseed, soybean, and peanuts. As disclosed, the denaturing can be accomplished by heat treating or by treatment with alkalies, acids, or formaldehyde. Unfortunately, the potential gains in mushroom yields are disadvantageously offset by the economic penalty associated with the denaturation treatment. The potential health and environmental hazards of denaturing treatments such as formaldehyde is also a disadvantage.

Wu (U.S. Pat. No. 4,534,781) teaches an improved nutrient supplement comprising a particulate nutrient, such as a cracked soybean particle, coated with a hydrophobic material that is not readily assimilable by competing microorganisms in the compost. A further improvement in this technology was taught by Wu & Bretzloff (U.S. Pat. No. 4,617,047) in which the protein containing nutrient is coated with a hydrophobic material and a mold inhibitory composition. Again, the potential gains in mushroom yield are disadvantageously offset by the cost associated with the antimicrobial treatments. The cost and potential health and environmental hazards of the mold inhibitory treatments are also a disadvantage.

Katz et al. (Eur. Pat. Publ. 0 0290 236) teaches another nutrient supplement for mushroom cultivation, prepared by coating protein rich particles with a hydrophilic carbohydrate. This coating also retards the release of nitrogen into the medium. Pratt et al. (U.S. Pat. No. 4,764,199) teach a mushroom growing supplement prepared from acidic corn gluten meal treated with aqueous formaldehyde while maintaining the meal in a free flowing condition.

Romaine & Marlowe (U.S. Pat. Nos. 5,291,685 and 5,427,592) teach another nutrient supplement for mushroom cultivation in which intact seeds, such a rapeseed, or other small oilseed are heat treated, such as at 90.5° C. (195° F.) for 24 hours. The heat treatment prevents sprouting and provides a delayed release mechanism for seed nutrients.

The Romaine & Marlowe supplement is used at fairly high rates of between 7 and 14% of the dry weight of the compost All prior art for mushroom supplements involves treating nutrients with heat or chemicals to reduce the availability of the nutrients to competing microorganisms in the compost. In all cases, treatments represent a significant portion of the cost of the supplement. In the case of chemical treatments of the supplements, ingredients such as formaldehyde and various pesticides represent potential health and environmental hazards, and the practicality of using such agents may be reduced due to regulatory issues. The development of mushroom supplements without using such chemicals is highly desirable.

Brini & Sartor (European Patent Application EP 0 700 884 A1) teach a mixture of a water retaining-dispersing agent (e.g., peat), a buffer, a protein containing component (e.g. soybean meal), a growth promoting component (e.g. corn gluten and/or corn starch), and water. The mixture is sterilized, inoculated with the mushroom fungus, and used to spawn mushroom compost. The formulation inoculates the mushroom beds and adds protein, while eliminating residual antimicrobial substances and suppressing the growth of antagonistic molds. Moisture contents of the mixtures are typically 54 to 60%. Protein contents of the mixtures are 4 to 20 wt % protein (1.4 to 8.0 wt % nitrogen). Mixtures typically contain 7.4 to 15.2 wt % (2.63 to 6.08 wt % nitrogen). Use of the mixtures as mushroom spawn is asserted to allow the faster growth of the mushroom and prevent the growth of molds. However, routine experimentation has shown that the mixtures taught by Brini & Sartor tend to form clumps, resulting in incomplete sterilization and areas within the mixtures that are not completely colonized by the *Agaricus bisporus* mycelium. The failure to achieve sterilization results in an economic loss, while a poorly colonized mixture can allow the growth of competitor molds and bacteria in the compost, causing high compost temperatures and reducing mushroom yield.

SUMMARY OF THE INVENTION

It is an object of the present invention to provide a mushroom spawn-supplement to inoculate mushroom compost and provide performance at least equivalent to existing mushroom spawn formulas in mushroom yield and time to achieve full colonization of the substrate.

It is a further object of this invention to provide a formulated mushroom spawn with small particles in order to maximize the number of points of inoculum in the mushroom substrate and to reduce the time for full colonization of the substrate.

It is a further object of this invention to provide a formulated mushroom spawn with a high content of nutrients to reduce or eliminate the need to separately add a mushroom nutrient supplement.

It is a further object of this invention to provide supplementary nutrients to the mushroom substrate without a resultant detrimental increase in compost temperature.

It is yet another object of this invention to provide supplementary nutrients to the mushroom substrate without the need to treat the nutrients with pesticides, denaturants, or other chemical or physical treatments to eliminate the growth of competing microorganisms.

It is yet another object of this invention to provide a formulated mushroom spawn that reduces the risks of sterilization failure and incomplete colonization of the mixtures by improving aeration of the mixtures and reducing the formation of clumps.

These and other objects are met by the present invention which comprises an improved mushroom spawn-supplement which is formulated with mixtures of: (a) proteinaceous ingredients such as corn gluten, feather meal, cracked soybeans, soybean meal, cottonseed meal, or other ingredient to provide a high nutrient content; (b) paper pellets to provide multiple points of inoculum and water holding capacity; (c) particulate materials such as calcined earth, vermiculite, perlite, or similar material to provide multiple points of inoculum, water holding capacity, aeration of mixtures, density, and a free flowing character to the mixtures, (d) calcium carbonate ($CaCO_3$) to neutralize pH, and (e) water. The spawn-supplement optionally contains (f) gypsum ($CaSO_4 \cdot 2\ H_2O$) to reduce clumping.

The spawn-supplement may optionally contain a fraction of grain (i.e., rye, millet, wheat) as used in the prior art. Oleaginous ingredients such as various vegetable oils may be added to increase the total nutrient content of the spawn-supplement. The proteinaceous and oleaginous components of the spawn-supplement can be combined by using ingredients such as whole cracked soybeans which contain both protein and oil.

Mushroom spawn-supplement according to the invention contains (on a dry weight basis): about 5 to 80 wt % proteinaceous ingredient, about 2 to 30 wt % paper pellets, about 5 to 60 wt % particulate material, about 1 to 12 wt % $CaCO_3$, and optionally about 1 to 10 wt % $CaSO_4$ (gypsum). Water is added to between 40 and 54%. If used, grain is added at about 1 to 50 wt % (dry weight basis). Mixtures are sterilized, inoculated, and incubated in any suitable manner within the skill of the art.

Mushroom spawn-supplement is generally used to inoculate mushroom compost at rates between about 1 and 8 wt % (fresh weight supplement/dry weight compost). When prepared and used as disclosed herein, mushroom spawn-supplement reduces the time to achieve full colonization of the mushroom compost and provides unexpected increases in mushroom yield and production efficiency. Mushroom spawn-supplement used at 4 to 5 wt % supports a mushroom yield at least equivalent to the use of 3 wt % rye spawn and 4 wt % traditional mushroom supplement. Use of traditional mushroom supplements in addition to the spawn-supplement may further improve mushroom yield. Addition of small amounts (i.e., 2%) of traditional supplements generally do not contribute significantly to compost heating.

The spawn-supplement of the present invention provides a fully functional formulated mushroom spawn and mushroom supplement in a single composition. Because the spawn-supplement as disclosed is heavily colonized with *Agaricus bisporus* mycelium, most foreign microorganisms cannot grow well on the material. Therefore, the invention also provides a mushroom supplement containing no pesticides, denaturants, or other chemical or physical treatments to control the growth or competing microorganisms and avoids deleterious increases in compost temperature. The invention unexpectedly reduces the frequency and severity of "green mold" disease caused by virulent strains of *Trichoderma harzianum*.

The spawn-supplement of the present invention as disclosed differs from perlite spawn as taught by Lemke (1971) and Fritsche (1978) in that the nutrient content of spawn-supplement, especially the protein nitrogen content, is maximized. Typical nitrogen contents of spawn-supplement are approximately four-fold to five-fold higher than of perlite spawn. During the course of investigations leading to the development of spawn-supplement, many formulations were developed that represent functional "non-grain spawns." The generally low nutrient contents of the non-grain spawns require that traditional mushroom supplements be added to the compost to achieve maximum mushroom yields.

The spawn-supplement of the present invention as disclosed differs from the mixtures taught by Brini & Sartor in that nitrogen contents are substantially higher, moisture contents are substantially lower, and the invention is less subject to sterilization failure and clumping of the finished product. The latter difference is due to the presence of particulate ingredients that improve steam penetration during sterilization. The particulate materials also provide better aeration of the mixtures during mycelial growth, reducing "dead spots" due to clumping or excessive moisture of parts of the mixtures.

It is to be understood that both the foregoing general description and the following detailed description are exemplary and explanatory only and are not restrictive of the present invention as claimed.

DETAILED DESCRIPTION

Figure 1:
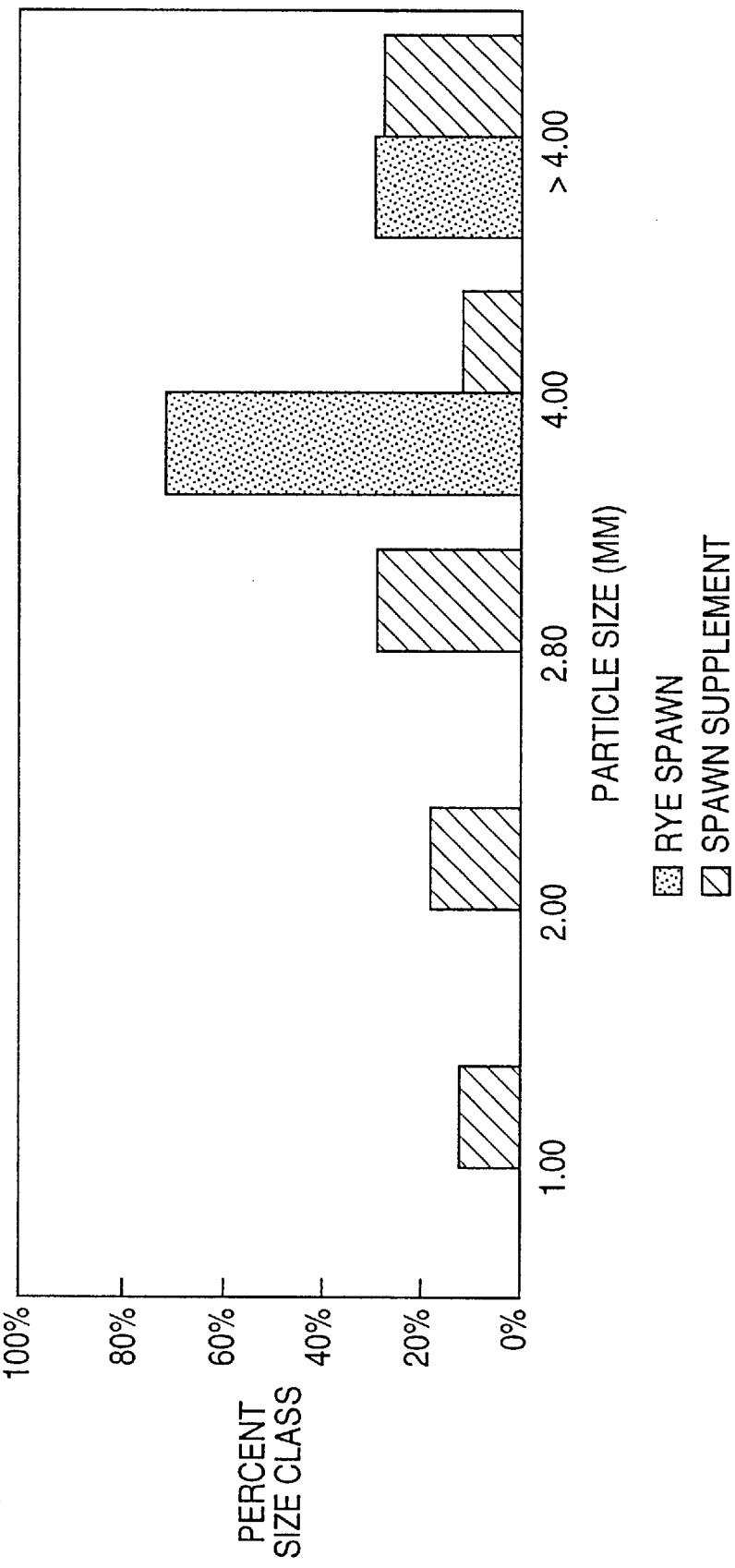
FIG. 1 compares the particle size distribution for rye spawn and spawn-supplement (formula 83).

As disclosed, the present invention comprises a formulated mushroom spawn with sufficiently high nutrient content that addition of supplementary nutrient formulations (i.e., mushroom supplement) is unnecessary. Mixtures of proteinaceous ingredients (corn gluten, soybean meal, feather meal, wheat bran, etc.) and/or oleaginous ingredients (cracked soybeans, soybean fines, soybean oil, sunflower oil, cracked sunflowers, corn oil, etc.), paper pellets, particulate materials to improve water holding capacity and aerate the mixture (calcined earth, vermiculite, perlite, etc.), $CaCO_3$, $CaSO_4 \cdot 2\ H_2O$ (optional), and water are prepared, steam sterilized, inoculated with starter cultures of *Agaricus bisporus*, and incubated at permissive conditions. After incubation to allow colonization of the spawn-supplement by the *Agaricus bisporus* mycelium, the spawn-supplement is used to inoculate mushroom compost in a manner equivalent to the prior art for mushroom spawn and mushroom supplement. Some experimental data suggest that addition of small amounts of traditional mushroom supplements may further enhance mushroom yields. Additional mushroom supplements may be added in any suitable amount, typically 1 to 6 wt % preferably about 2 wt % additional mushroom supplements.

Spawn-supplement formulas can have a nitrogen content as low as 1% (dry weight) nitrogen. A typical and preferred spawn-supplement formula of the present invention (see example 1) contains at least about 3.5%, more preferably about 6.0 to 6.5% (dry weight) nitrogen (Kjeldahl), although formulas with higher or lower nitrogen contents can be prepared. This preferred nitrogen content is substantially higher than the approximately 2.3% (dry weight) nitrogen present in rye spawn. Currently available mushroom supplements typically contain 5.6 to 9.6% (dry weight) nitrogen. Spawn-supplement, as disclosed, unexpectedly supports mushroom yields equivalent to or higher than those obtained with higher levels of grain spawn and supplement. For example, the spawn-supplement formulas described in the examples give the same yield when used at 4 to 5% as rye spawn at 3% plus 4% S41 or S44 supplements. The example 1 spawn-supplement formula delivers about the same total nitrogen to the compost as the standard rye grain plus supplement combination. The example 2 spawn-supplement delivers less than half of the nitrogen of the standard rye grain plus supplement combination. The spawn-supplement formulas in example 3 (formulas 68 and 78) deliver about half of the nitrogen as the standard rye spawn plus supplement combination.

While the phenomenon is not fully understood, and speculation should not limit the scope of the claims, it is believed that the rapid colonization of the compost resulting from the use of spawn-supplement allows the *Agaricus bisporus* mycelium to benefit more from the nutrients than the slower colonization of grain spawn and supplement. That is, rapid colonization allows the *Agaricus bisporus* mycelium to absorb the nutrients. With a standard grain spawn and supplement combination, the competing microorganisms in the compost utilize the nutrients to the detriment of *Agaricus bisporus*.

Points of inoculum: Spawn-supplement as disclosed contains significantly more particles per unit weight than grain spawn. Rye spawn typically contains about 1,500 to 2000 kernels per 100 g (at 50% moisture content). Rye spawn has 79% of the particles between 3 and 4 mm in average size and 29% of the particles greater than 4 mm (FIG. 1). Millet spawn typically contains about 10,000 particles per 100 g (at 46 to 48% moisture). The Brini and Sartor formulation contains about 9,000 particles per 100 g (at moisture contents in excess of 54%). The present invention preferably contains at least 10,000 particles per 100 g, more preferably at least 25,000, even more preferably at least about 40,000. There is no upper limit contemplated. It is believed that amounts up to 100,000 or more can provide a functional spawn-supplement. Spawn-supplement (example 1 formula) is estimated to contain over 42,000 particles per 100 g (at 48% moisture content). It is difficult to accurately estimate the total number of particles because of their small size and large number. About 30% of the particles are smaller than 2.0 mm, and about 12% are smaller than 1.0 mm. The large increase in the number of points of inoculum results from the use of ingredients with low bulk densities and fine textures. The small particles are fully colonized with *Agaricus bisporus* mycelium. When mixed with the compost, they efficiently inoculate the mushroom substrate. Because of the larger number, the average distance between spawn-supplement particles is smaller than with rye spawn. Given that *Agaricus bisporus* has a fixed linear growth rate, the distance the mycelium must grow to reach confluence is reduced. As a result, the time to achieve confluent growth through the compost is also reduced. Completion of spawn run is generally defined as achievement of heavy, confluent growth in the compost. Use of spawn-supplement therefore reduces the total spawn run time. FIG. 1 demonstrates the particle size distribution of the spawn-supplement of the present invention and rye spawn.

Completion of spawn run is subjectively determined. In various tests of spawn-supplement on a research scale and on commercial mushroom farms, spawn run was perceived to be complete within 10 days with the spawn-supplement of the present invention. In contrast, a grain spawn and supplement combination generally requires 13–15 days to achieve a similar level of growth. Therefore, the use of spawn-supplement can reduce spawn run time by about 3 to 5 days.

Figure 2:
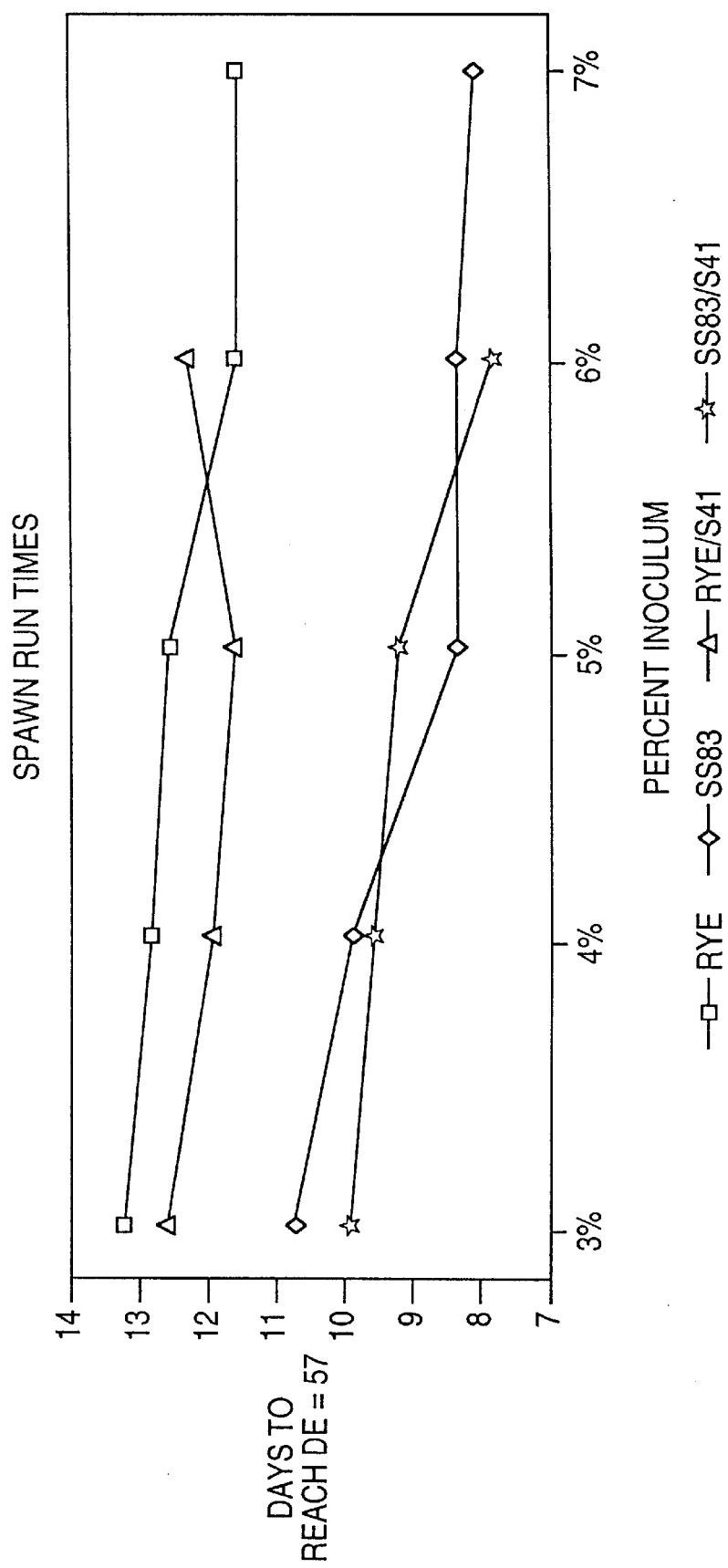
FIG. 2 shows the growth rate of *Agaricus bisporus* mycelium in compost inoculated with rye spawn or a spawn-supplement.

In an attempt to objectively measure spawn run time, batches of compost were inoculated with varying levels (3 to 7%) of a standard rye grain spawn with or without supplementation with S41 mushroom supplement or varying levels of spawn-supplement formula 83 (see example 1) with or without S41 mushroom supplement. At daily intervals, the color of the surface of the compost was measured using a Minolta color meter. Color was expressed on a "delta E" scale, where a smaller number represents a whiter color. Uninoculated compost typically has a delta E value of about 75 arbitrary units. A standard 3% spawning rate with rye spawn results in a delta E of 57 arbitrary units after 13 days of spawn run. Therefore, a delta E of 57 was taken as a color value representing a completed spawn run. The time required for other experimental treatments to reach a delta E of 57 was calculated from daily color determinations. The results of this test are summarized in FIG. 2.

While use of 3% rye spawn results in a 13 day spawn run, increasing the spawning rate to 7% rye spawn provides a complete spawn run in about 12 days. Use of 3% spawn-supplement formula 83 results in a completed spawn run in about days. Increasing the spawning rate to 7% formula 83 spawn-supplement provides a completed spawn run in about 8 days. A linear regression analysis shows that with rye spawn, each additional percentage point in the spawning rate results in a 0.45 day decrease in spawn run time (2 correlation coefficient=0.919). The same analysis shows that for each additional percentage point of spawning with spawn-supplement formula 83, spawn run time is shortened by 0.67 days (2 correlation coefficient=0.856). Clearly, spawn-supplement results in a faster spawn run than the use of rye spawn, which has larger particles and fewer points of inoculum. There is no clear effect of addition of supplementary nutrients on spawn run time, although some data show an increase in mushroom yield with further supplementation.

A shortenend spawn run is advantageous for many mushroom growers, particularly those employing the bed (or shelf) and bag methods of growing mushrooms. A faster spawn run reduces the time between the beginning of a mushroom crop and the appearance of the first mushrooms. Reducing this unproductive period improves the efficiency of a mushroom farm. By shortening the spawn run time, more crops per year can be grown in a given space, resulting in an overall mushroom yield increase for a facility. A shorter total cropping period also reduces the time available for pests and pathogens to become established. Short cropping cycles are associated with a reduction in diseases and pests on mushroom farms.

Temperature effect/Spawn-supplement resists microbial growth: In spawn-supplement, all particles are heavily colonized with *Agaricus bisporus* mycelium. This heavy mycelial growth is believed to effectively reduce or prevent the growth of competing microorganisms on the particles. The reduction or prevention of growth by competitors minimizes the compost temperature increases often associated with the use of mushroom supplements. *Agaricus bisporus* has an optimum temperature for growth of about 25 to 26° C. Growth is progressively reduced above about 28° C., and virtually absent above about 35° C. *Agaricus bisporus* is physiologically incapable of causing dangerously high temperatures in the compost, since its growth rate and associated rate of metabolism are reduced above its temperature optimum. In contrast, many of the competitor microorganisms present in mushroom compost are capable of growing at elevated temperatures. Indeed, the composting process selects for thermotolerant and thermophilic microorganisms (Fermor et al. 1985). If provided with available nutrients, the metabolic heat from these microorganisms would increase the compost temperature to levels that would be dangerous to *Agaricus bisporus*.

To demonstrate the effect of heavy *Agaricus bisporus* mycelial growth on competitor microorganisms, the following experiment was conducted. Spawn-supplement formula 83 was prepared and sterilized as usual. One replicate was inoculated with *Agaricus bisporus* and allowed to grow for 14 days. A second replicate was uninoculated and held under sterile conditions for 14 days. A rye spawn formula was prepared as usual, with one replicate inoculated and another left uninoculated. In addition, cracked soybeans with a supplement coating (i.e. S41) and without a coating (untreated soybeans) were obtained. S41 and untreated cracked soybeans were moistened with sterile deionized water. Sterility was relaxed on day 0 of this test, and all materials were placed in nonsterile petri dishes and maintained at 25° C., ca. 80% relative humidity. Materials were inspected daily for evidence of mold growth and bacterial contamination. Results of this test are summarized in Table 1.

TABLE 1

| TREATMENT | MICROBIAL GROWTH |
| --- | --- |
| RYE SPAWN | NO GROWTH IN 9 DAYS |
| RYE SUBSTRATE | MOLD AND BACTERIA, 4 DAYS |
| FORMULA 83 SPAWN-SUPPLEMENT | NO GROWTH IN 9 DAYS |
| FORMULA 83 SUBSTRATE | MOLD AND BACTERIA, 4 DAYS |
| S41 SUPPLEMENT | MOLD IN 6 DAYS |
| CRACKED SOYBEANS, NO COATING | MOLD IN 3 DAYS |

This test clearly shows that colonization of a nutrient substrate by the *Agaricus bisporus* mycelium exerts a protective effect against attack by molds and bacteria. A similar antimicrobial effect is seen when spawn and spawn-supplement is added to compost. As shown in several examples, spawn-supplements do not support mold growth in compost. In contrast, other commercially available supplements eventually support the growth of mold and other microorganisms. The absence of growth of competitor microorganisms results in lower peak compost temperatures during spawn run. Lower compost temperatures are an advantage for mushroom growers, since the deleterious effects of heat on *Agaricus bisporus* growth are avoided. In addition, lower peak compost temperatures will result in cost savings by avoiding the need for air conditioning to reduce dangerously high compost temperatures. This is especially true during warm weather periods.

In addition to lower maximum compost temperatures, production data from several commercial mushroom farms show that the compost temperature increases that occur do so several days earlier with spawn-supplement than with a grain spawn plus supplement combination. Addition of rye spawn plus supplement typically results in a maximum compost temperature at about 8 to 10 days after spawning. In contrast, the maximum compost temperature observed with spawn-supplement often occurs about 5 or 6 days after spawning. This change in the time of the peak compost temperature is of value to mushroom growers, since it avoids high temperatures at and after casing. High compost temperatures can require several days to be brought under control. The time can be even longer during summer months or on mushroom farms with marginal cooling capacity. Addition of a peat moss casing layer to mushroom compost provides an insulating effect. If compost temperatures are even marginally high, the casing layer exacerbates the effect, and can result in dangerously high temperatures. By providing a maximum compost temperature several days earlier, the use of spawn-supplement reduces the possibility that post-casing spawn run temperatures will reduce mushroom yield.

Absence of chemicals and heat treatments: A clear advantage of the spawn-supplement formulas as disclosed is that the yield increases and protection against competitor microorganisms are achieved without the use of physical or chemical treatments. Addition of chemicals such as formaldehyde or fungicides to nutrient supplement mixtures can result in substantial cost disadvantages. The chemicals used may represent safety or environmental hazards. As noted by Romaine & Marlowe (U.S. Pat. No. 5,427,592), future use of biohazardous chemicals in the mushroom industry is tenuous. Formaldehyde has been restricted by the U.S. Environmental Protection Agency, and California now requires the routine monitoring of workers handling one supplement for formaldehyde exposure. Heat treatments of supplements are also costly. By including supplementary nutrients in a material that is already subject to steam heat to achieve sterilization, substantial cost advantages can be achieved over having larger quantities of two different heat treated materials (i.e., both spawn and supplement).

Protection against Trichoderma (Green Mold) disease: The worldwide mushroom industry has recently been plagued by a virulent "Green Mold" disease caused by *Trichoderma harzianum*. Substantial losses in mushroom production, with an attendant monetary loss, have been experienced in the U.S., Canada, England, Ireland, and elsewhere. Tests have shown that the presence of soluble carbohydrate due to grain spawns contributes to the growth of the virulent Trichoderma (Fletcher, 1997). Since the spawn-supplement formula as described contains little starch or other readily available carbohydrate, the use of this formula was found to reduce the incidence and severity of the green mold disease. Tests at the Campbell's Fresh Prince Crossing mushroom farm (West Chicago, Ill.) and other commercial mushroom operations have shown that green mold disease is substantially reduced when spawn-supplement formulas 80 or 83 are used to spawn mushroom beds (see examples 2 and 7).

To further investigate the ability of spawn-supplement to resist *Trichoderma harzianum* infection, the following experiment was conducted. Four large sterile screw-capped glass tubes were filled with either 30 g of rye spawn prepared according to standard procedures or 30 g of spawn-supplement formula 83. In both cases, the substrates were fully colonized with *Agaricus bisporus* strain M466. A single agar plug containing a sporulating culture of virulent *Trichoderma harzianum* biotype TH4 was placed on the surface of the substrates in each tube. Tubes were loosely capped to allow air exchange and incubated at room temperature for 6 days. Three of the four tubes containing rye spawn showed vigorous growth of *T. harzianum* within the six day period. No sporulation of the *T. harzianum* was observed within that period. None of the four tubes containing spawn-supplement showed growth or sporulation of the virulent Trichoderma. In a parallel test, all tubes containing either rye spawn or spawn-supplement formula 83 that were not heavily colonized with *Agaricus bisporus* supported the growth and sporulation of *Trichoderma harzianum*. It is clear from this test that fully colonized spawn-supplement formula 83 resists the growth of the causative agent of "Green Mold" disease. Commercial mushroom production data further support the conclusion that the use of spawn-supplement helps to reduce or eliminate the incidence of "Green Mold" disease.

Principal nutrient source: The principal nutrient source is one that provides high levels of protein nitrogen. While corn gluten is a favored principal nutrient source, other ingredients may be substituted successfully. Corn gluten meal is the dried residue from corn after the removal of the larger part of the starch and germ, and the separation of the bran by the process employed in the wet milling manufacture of corn starch or syrup, or by enzymatic treatment of the endosperm. Corn gluten is water insoluble and hydrophilic, making it particularly suitable for use as a nutrient by a saprophytic fungus. Corn gluten is available from several sources, including Cargill, Inc. Corn gluten typically contains either 60% protein content (9.6% nitrogen) or 48% protein content (7.68% nitrogen). There is no apparent qualitative difference in performance using either 60% or 48% protein corn gluten. However, use of the 60% protein corn gluten allows the addition of higher nitrogen contents to a given spawn-supplement formula.

Hydrolyzed feather meal is also a favored principal nutrient that can be used alone or in combination with corn gluten or other nutrient source. Feather meal is the product resulting from the treatment under pressure of clean, undecomposed feathers from slaughtered poultry. Feather meal typically contains 80–85% protein, with over 75% of the crude protein in a digestible form. Feathers contain a high content of keratin, a class of fibrous proteins found in vertebrate animals. Because of extensive cross linking of disulfide bonds, keratins are more resistant to hydrolysis than most other proteins. This resistance to hydrolysis makes keratin suitable for use as a nutrient by a saprophytic fungus. Keratin can absorb and hold water, but is generally insoluble in water and organic solvents.

Other principal nutrient sources that have been used successfully in preparing spawn-supplement are listed in Table 2.

TABLE 2

Nutrient sources for spawn-supplement

| NUTRIENT SOURCE | % NITROGEN |
| --- | --- |
| UREA | 42.00 |
| FEATHER MEAL | 15.30 |
| BLOOD MEAL | 14.38 |
| CORN GLUTEN | 11.00 |
| CONDENSED FISH SOLUBLES | 9.68 |
| DRIED ALGAE (SCENDESMUS) | 8.14 |

TABLE 2-continued

Nutrient sources for spawn-supplement

| NUTRIENT SOURCE | % NITROGEN |
| --- | --- |
| PEANUT MEAL | 8.00 |
| SOYBEAN MEAL | 7.68 |
| YEAST SLUDGE | 7.65 |
| COTTONSEED MEAL | 7.50 |
| SAFFLOWER MEAL | 7.31 |
| CHEESE WHEY | 7.31 |
| SUNFLOWER MEAL | 7.16 |
| WHOLE CRACKED SOYBEANS | 6.40 |
| WHOLE SOYBEANS | 6.40 |
| CANOLA MEAL | 6.06 |
| LINSEED MEAL | 5.98 |
| DISTILLERS DRIED GRAIN | 4.75 |
| COTTONSEED WASTE | 3.89 |
| CORN STEEP LIQUOR | 3.65 |
| WHOLE CANOLA | 3.52 |
| ALFALFA | 2.96 |
| WHEAT BRAN | 2.75 |
| WHEAT FLOUR | 2.71 |
| CHICKEN LITTER | 2.70 |
| AMARANTH FLOUR | 2.58 |
| BONE MEAL | 2.45 |
| TURKEY LITTER | 2.20 |
| GRAPE PUMICE | 2.03 |
| SUNFLOWER HULLS | 1.84 |
| RYE FLOUR | 1.83 |
| PEANUT HULLS | 1.79 |
| BARLEY FLOUR | 1.76 |
| SOYBEAN HULLS | 1.62 |
| GROUND CORN | 1.53 |
| BLUE CORN MEAL | 1.48 |
| CORN FLOUR | 1.40 |
| YELLOW CORN MEAL | 1.26 |
| COTTONSEED HULLS | 0.64 |
| CORN STARCH | 0.11 |

The nutrients with the highest nitrogen contents are favored for use in spawn-supplements, since they allow the highest possible total nitrogen content in the finished product. The nutrient sources generally contain protein nitrogen and may contain fats, oils, carbohydrates, and micronutrients. Persons skilled in the art could imagine many more possible nutrient sources. While an abundance of experimental data show that protein nitrogen is a favored nutrient source for *Agaricus bisporus*, other nutrients in the proper form and proportion could easily be defined by routine experimentation.

Paper pellets: Paper pellets preferably are, but not limited to, a mixture of 53% shredded paper (newsprint or bond paper), 22% peat moss (<35% moisture), 17% proteinaceous material (soybean fines, etc.), 5.4% $CaCO_3$, and 1.6% $CaSO_4 2 H_2O$. The mixture is pelleted to a 3.2 mm (⅛") diameter cylinders at 70 to 82° C. and an 18.2 kg/hour feed rate. By assuring that the peat moss ingredient has a moisture of <35%, the finished pellets have a moisture content of <12%, and therefore do not support mold growth. The material typically has a nitrogen content of 1.5 to 1.6%. Pelleting is done to improve the handling of the material. The pelleted material has a higher density and lower volume than unpelleted material, and is well mixed. Pellets are hammer milled such that about 80% of the resulting fragments are between 4.75 mm and 0.85 mm in size. The pellets fall apart after being hydrated to provide a larger number of small particles and "points of inoculum".

Particulate material: A particulate material such as calcined earth, perlite, vermiculite, or other ingredient is added to the spawn-supplement formula to provide multiple points of inoculum, increase water holding capacity, aerate the mixtures, control the density of the mixture, and help to maintain a free flowing characteristic. Typical particulate ingredients include calcined earth, vermiculite, and perlite, but other particulate materials can be substituted successfully.

Calcined earth is a clay based material that is subjected to a calcination process. The clay is heated to a temperature below its melting point to bring about a state of thermal decomposition. The calcination process results in a porous material that readily absorbs water. Depending on the particle size, calcined earth can absorb at least 100% of its weight in water. Calcined earth is commercially available under the "Turface", "Oil Dri", and other brand names. Calcined earth is available in a range of particle sizes. Dry calcined earth has a density of approximately 598 g/l for the 8/16 mesh size. Various particle sizes affect the density of the finished spawn-supplement product, and therefore are useful in formulating the product. The functional characteristics of calcined earth are similar regardless of the particle size. Smaller calcined earth particle sizes are perceived to be preferable in that they deliver more points of inoculum per unit weight.

Vermiculite is a hydrated magnesium-iron-aluminum silicate treated at high temperatures to cause expansion. The material has a low density (97 to 109 g/l), is water insoluble, and can absorb 200 to 500% of its weight in water.

Perlite is a volcanic glass material that is heated to cause its expansion and to improve its ability to hold moisture. It is typically used as a plant growth medium. It has a low density of about 109 g/l, and can absorb about 250% of its weight in water.

The selection of the appropriate particulate material for the spawn-supplement formula is based on desired final product density, particle sizes, desired number of particles (points of inoculum), cost, ease of handling and use, and other characteristics. The spawn application equipment used by most mushroom growers is designed and optimized to deliver specific weights and volumes of grain spawn. High density materials such as calcined earth can be mixed with low density materials such as vermiculite and perlite to closely approximate the density of grain spawn in the finished spawn-supplement formula.

One beneficial characteristic of the particulate materials used in spawn-supplement formulae is that they generally contain pores, hollows, and a rough texture. The *Agaricus bisporus* mycelium grows into these pores, and is protected from damage due to abrasion as spawn is shaken during preparation or immediately prior to its being added to compost. In grain spawn, virtually all mycelial growth is on the surface of the kernels. When abraded, the surface mycelia are effectively scrubbed off, exposing the surface of the grain to potential contamination by competitor microorganisms. The protection from abrasion afforded by the rough texture of the particulate material makes the spawn-supplement resistant to the deleterious effect of shaking and abrasion.

The texture of the particulate materials is also of value in that the pores and hollows allow good aeration of the mixtures and help to avoid clumping of mixtures. Good aeration also helps in the sterilization process. Successful steam sterilization of a material requires that steam penetrate throughout the mass. A poorly aerated mixture restricts the penetration of steam. Dense clumps of material also restrict the penetration of steam. A failure of steam to penetrate the mixture results in cold spots that will not be successfully sterilized. The locally unsterilized areas of the mixtures reinoculate the substrate, resulting in contamination of the product. Sterilization failures are often due to the presence of bacterial spores, such as Bacillus spp. Bacillus contamination renders spawn unsuitable for use.

On occasion, a dense clump of a mixture achieves commercial sterility, but is not adequately colonized by the *Agaricus bisporus* mycelium due to poor oxygen penetration. *Agaricus bisporus* is a strictly aerobic fungus. Poor oxygen availability in the center of a clump of unmixed material restricts the growth of the fungus in the clump. When the uncolonized clump is eventually blended with mushroom compost, the nutrients can become available to the compost microorganisms. The availability of the nutrients results in the growth of competitor molds and high temperature in the compost. Inclusion of a particulate material (i.e., calcined earth) in the spawn-supplement formula reduces the formation of clumps in the mixtures and allows better oxygen penetration in the clumps that do form.

Inorganic components: $CaCO_3$ is added to the spawn-supplement formula to control pH through a buffering effect. *Agaricus bisporus* typically releases organic acids during growth. Inclusion of $CaCO_3$ in the formula avoids a significant reduction in pH during growth. Typical, but not limiting amounts include about 1 to 12% $CaCO_3$, more typically about 6 to 9%. Spawn-supplement formulas typically have a pH of about 7.2 immediately before being inoculated when made with tap water. The pH of the finished product is typically about pH 6.7. The exact content of $CaCO_3$ does not appear to be critical. The pH may range between 6 and 7.8, but is preferably between 6.2 and 7.4, and more preferably about 6.4–6.9.

$CaSO_4.2\ H_2O$ (gypsum) may be added to the spawn-supplement formula at approximately 7 to 8% of the total dry weight. The $CaSO_4$ appears to coat the outside of the particles to avoid clumping and make any lumps that do form easier to break up. The $CaSO_4$ is an optional, but desirable, component of the formula. $CaSO_4$ and $CaCO_3$ may be premixed in a 1:1 mixture to simplify addition of the ingredients.

Water/moisture content: The optimum moisture content for spawn-supplement is 48% moisture at the time of addition to compost. While rye and millet spawns generally lose moisture during sterilization and growth, spawn-supplement formulas do not lose a significant amount of moisture due to evaporation. Therefore, most formulas are adjusted to 48 to 50% moisture prior to sterilization. This moisture content allows vigorous growth of *Agaricus bisporus*mycelium on the substrate and optimum performance in the compost. This lower moisture content also helps to prevent the formation of clumps and allows better oxygen penetration into the mixtures. This helps to prevent sterilization failure and uncolonized areas of the final product.

Preparation of Spawn-Supplement:

Spawn-supplement mixtures are prepared by placing dry ingredients in a large mixing container such as a paddle mixer, cement mixer, or other suitable container in which the mixtures can be blended to obtain homogeneity. Ingredients are weighed, placed in the mixer, and mixed until thoroughly blended. Sufficient water is added as a fine spray to bring the mixtures to approximately 48% moisture. Additional mixing after the addition of water reduces any clumping that may occur. Polycarbonate jars (4.84 1 total capacity) are filled with 2.8 kg of the hydrated mixtures. This weight of a standard spawn-supplement formula (i.e., formula 83) fills the jars to approximately 75 to 80% of capacity. Some formulas are denser than formula 83. With denser formulas, the jars contain less total volume. Jars are filled either manually or with an automated jar filling machine. Jars are capped with lids containing a breathable filter element that allows the passage of air and steam but prevents the passage of microorganisms that would contaminate the finished product. The mixtures are steam sterilized at times and temperatures needed to achieve commercial sterility. This is typically 124° C. for 150 minutes. Following sterilization, mixtures are cooled to less than ca. 27° C. Jars are briefly opened under aseptic conditions, and an inoculum is added. The inoculum may consist of millet or rye grain colonized with a suitable strain of the Agaricus bisporus fungus, and is added to jars at about 1.1 to 1.3% (vol/vol). Mixtures may also be inoculated with non-grain substrates colonized with Agaricus bisporus mycelium (U.S. Pat. No. 5,503,647) at a similar inoculation rate. Immediately following inoculation, jars are briefly shaken in a modified commercial paint shaker to distribute the inoculum throughout the mixture and to break up any lumps that may have formed during sterilization. Jars are incubated at approximately 25° C. for 4 to 6 days, at which time they are again shaken to evenly distribute the growing mycelium. After an additional 4 to 6 day incubation at 25° C., the mixtures are evenly colonized with mushroom mycelium. The spawn-supplement can be used immediately, or can be stored in the jars under refrigerated conditions (less than 3.3 to 4.4° C.). Alternatively, the contents of the jars can be transferred to ventilated plastic bags and stored pending use. Packaged mushroom spawn, including the presently disclosed spawn-supplement, is typically stored at less than 5.5° C. for approximately 14 to 21 days to allow the "regrowth" of the mycelium and the development of an even white color associated with heavy mycelial colonization.

While the above description describes the method of spawn-supplement used by the inventors, persons with ordinary skill could easily prepare spawn-supplement formulas by other methods used for spawn production. These methods include, but are not limited to, the methods described above (Background of the Invention).

Use of Spawn-Supplement:

Spawn-supplement is used in a manner similar to standard grain spawn and mushroom supplement combination. Details of use are inherent in the examples cited, and are familiar to those skilled in the art of growing mushrooms.

EXAMPLES

Example 1

| Formula 83 | |
| --- | --- |
| Corn Gluten (60% protein) | 30.2 g |
| Paper Pellets | 14.5 g |
| Calcined Earth (8/16 mesh) | 29.1 g |
| Feather Meal (15.4% nitrogen) | 17.4 g |
| CaCO$_3$ | 8.7 g |
| Water | 75.6 ml |

The nitrogen content of this formula is 6.39%. Spawn-supplement formula 83 was prepared essentially as described above, and was stored at <42° F. In this specific example, phase II mushroom compost was used. The compost was a standard wheat straw/horse manure blend formula that had undergone a 22 day phase I composting process and a 9 day phase II process. Compost (193 lb fresh weight, equivalent to 72 lb dry weight at 63% moisture) was filled into each of 12 4'x3' wooden trays (6 lb/ft$^2$ dry weight). Trays were individually dumped onto a conveyor belt. Four trays were each inoculated with 982 g rye spawn, strain M466 (3% rate) and were amended with 1,309 g S44 supplement (4% rate; S44 is heated, cracked soybeans treated with a hydrophobic coating and mold inhibitory composition). The spawn and supplement were thoroughly mixed into the compost, and compost was returned to the trays. Eight trays were spawned with 1,636 g spawn-supplement formula 83 (listed as "SS83" in Table 3, equivalent to 5% fresh weight spawn-supplement to dry weight compost). Compost in all 12 trays was hydraulically compressed, covered with polyethylene sheets to reduce moisture loss, and placed in an environmentally controlled room. Humidity in the room was maintained at 85%, and air temperature was controlled by a Fancom model 1060 mushroom computer in an attempt to maintain a 76° F. compost temperature. Compost and air temperatures were recorded at 240 minute intervals with a data acquisition system, at 255 minute intervals by the Fancom computer, and at daily intervals using mercury thermometers. Trays were inspected daily to assess the growth of the Agaricus bisporus mycelium and for the presence of molds. After 15 days of spawn run, trays were top dressed with a 2" casing layer consisting of Sunshine brand peat moss, CaCO$_3$, and water (to 85% moisture). The casing layer was inoculated with 0.07 units/ ft$^2$ casing spawn. A standard temperature regime was maintained to promote mycelial growth into the casing layer, and trays were watered as needed. All trays were "flushed" by the introduction of fresh air and cooling to 66° F. on day 6. Mushrooms were first harvested 15 days after casing. Mushroom yield data (lb/ft$^2$) for this test are as follows:

TABLE 3

Yield data (in lb/ft$^2$) for experiment 892.

| SPAWN | 1$^{ST}$ BREAK | 2$^{ND}$ BREAK | 3$^{RD}$ BREAK | TOTAL |
| --- | --- | --- | --- | --- |
| 3% RYE/4% S44 | 2.69 | 1.83 | 0.94 | 5.47 B |
| 5% SS 83 | 2.44 | 2.26 | 1.39 | 6.10 A |

Values with the same letter in the "total" column are not statistically significant at the 95% confidence level.

The average yield using the formula 83 spawn supplement was 0.63 lb/ft$^2$ higher than using the standard rye spawn plus soybean based supplement formula. This yield increase is statistically significant at the 95% confidence level. The formula 83 spawn supplement also appears to provide a more desirable mushroom production pattern. Mushroom production is typically highest in the first break, with lower yields in subsequent breaks. High first break yields are sometimes associated with poorer mushroom quality because of problems with air circulation around and between mushrooms and the resultant higher localized humidity. The formula 83 spawn supplement provides a reduced first break yield, but proportionally higher yields in the second and third breaks for an overall yield increase.

Figure 3:
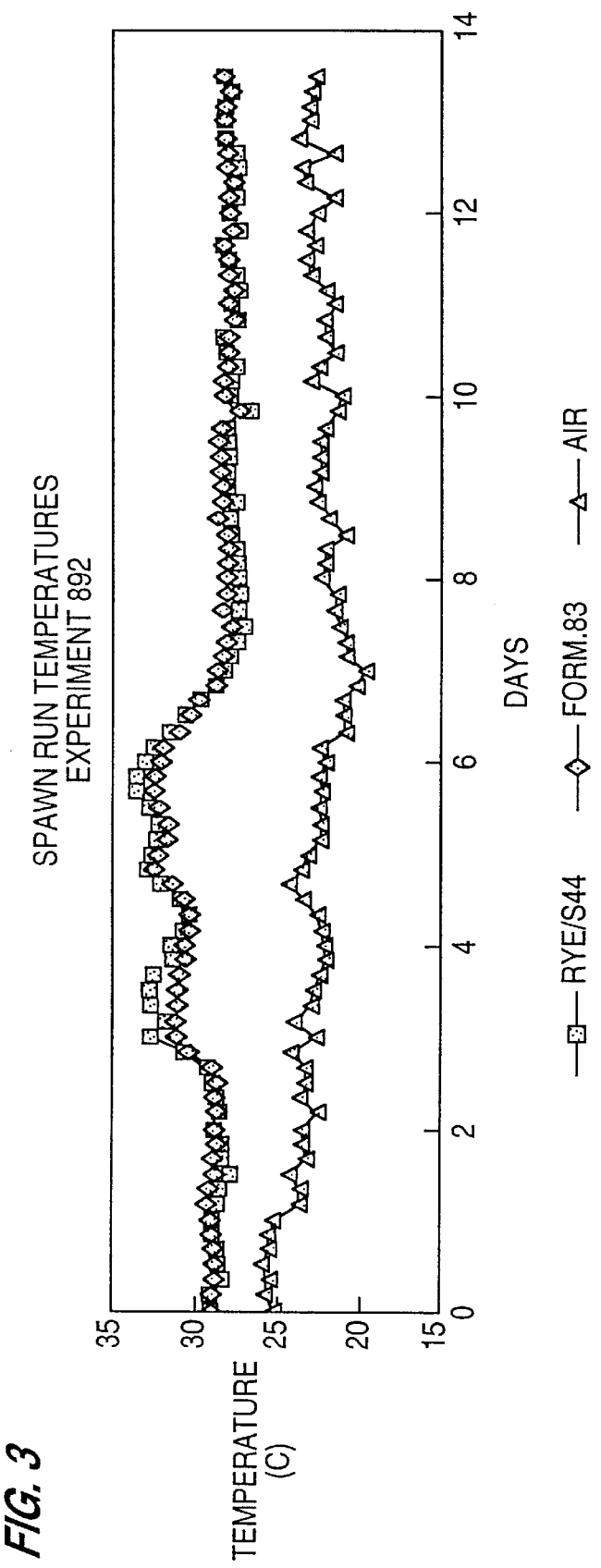
FIG. 3 shows the effects on spawn run compost temperature of a standard rye spawn plus S44 supplement and a spawn-supplement (formula 83).

Mold growth on the standard rye spawn plus S44 supplement combination was rated as medium to heavy. This combination can support the growth of mucoraceous fungi as well as Penicillium, Aspergillus, and other common airborne molds. No mold growth was observed at any time in this trial on trays inoculated with the formula 83 spawn-supplement. The absence of mold growth on trays inoculated with the formula 83 spawn-supplement is consistent with temperature data for this trial. Temperature data for this trial are summarized in FIG. 3.

The standard rye spawn plus supplement combination had a peak compost temperature of 33.8° C. on day 7 of spawn run. The spawn-supplement formula in this example had a maximum compost temperature of 32.5° C., also on day 7 of spawn run. While maximum compost temperatures differ, the average compost temperatures over the 14 day spawn run are similar (29.3° C. for the standard rye spawn plus supplement, 29.2 for the spawn-supplement). The heat released by the spawn-supplement is spread over a longer period rather than being manifest as temperature surges during spawn run. This helps to protect the *Agaricus bisporus* mycelium from the deleterious effects of high compost temperatures.

Example 2

| Formula 80 | |
|---|---|
| Corn Gluten (60% protein) | 30.3 g |
| Paper Pellets | 22.4 g |
| Vermiculite | 19.4 g |
| Calcined Earth | 18.8 g |
| CaCO$_3$ | 9.1 g |
| Water | 78.8 ml |

The nitrogen content of this formula is 3.54%. The formula 80 spawn-supplement was made in a manner essentially as described previously. Following full colonization of the spawn-supplement, the material was packaged in ventilated polypropylene bags (20 lb/bag) and stored at 38° F. for approximately 21 days. The spawn-supplement was shipped to a standard "bed style" mushroom farm in which phase I compost is filled into fixed beds or shelves. Phase II pasteurization and conditioning, spawn run, case holding, and cropping occur in the beds without further moving the compost. This facility fills 6,830 ft$^2$ of bed space per house, and typically fills the beds with fresh compost at 28 to 29 lb/ft$^2$ of bed space. This translates to approximately 7 to 8 lb/ft$^2$ dry weight after phase II pasteurization and conditioning. A block of 9 houses was used for this test (house numbers 51 to 59). Seven houses used the standard mushroom growing conditions of 1,620 lb of rye spawn (approximately 3 wt %; fresh weight spawn per dry weight compost) plus 1,600 lb of S44 supplement (approximately 2.9 wt %). Two houses were spawned with the formula 80 spawn-supplement. House number 53 was spawned with 3,000 lb of the formula (approximately 6.3 wt %), while house 59 was spawned with 4,000 lb (approximately 7.3 wt %) of the formula. No supplement was used in either house 53 or 59. All houses were substantially equal in terms of compost quality and crop handling procedures. Rye spawn plus S44 supplement or formula 80 spawn-supplement were broadcast over the surface of the phase II compost. A mushroom "digging machine" was used to mix the inocula into the compost in the fixed beds. A digging machine is not unlike a garden tiller. All subsequent mushroom cultivation steps (casing, flushing, etc.) are familiar to those skilled in the art of mushroom growing.

The seven houses of standard rye spawn plus S44 supplement gave an average mushroom yield of 4.77 lb/ft$^2$. This yield is somewhat lower than usual for this facility because of sporadic "green mold" (7 *Trichoderma harzianum* biotype TH4) infections. The two houses spawned with the formula 80 spawn-supplement gave an average yield of 5.13 lb/ft$^2$, for an average yield increase of 0.36 lb/ft$^2$. The yield differences are not statistically significant due to the low number of replicates and unequal variances among the data. However, the 0.36 lb/ft$^2$ yield increase per house would translate into an extra 2,880 lb of mushrooms per house. As noted elsewhere, the preponderance of data show that the use of spawn-supplement provides yields equal to or greater than the standard rye spawn plus supplement combinations. In this test, the increased yield is believed in part to be associated with a reduced incidence of green mold. House 53 had a total of 3 spots of green mold during the entire crop cycle. House 59 had a total of 6 spots of green mold during the crop. In contrast, the remaining houses in this test block had an average of 84 green mold infection sites (range 40 to 139). The rapid colonization of the compost plus the absence of starchy nutrients appears to reduce the severity of the green mold disease.

Figure 4:
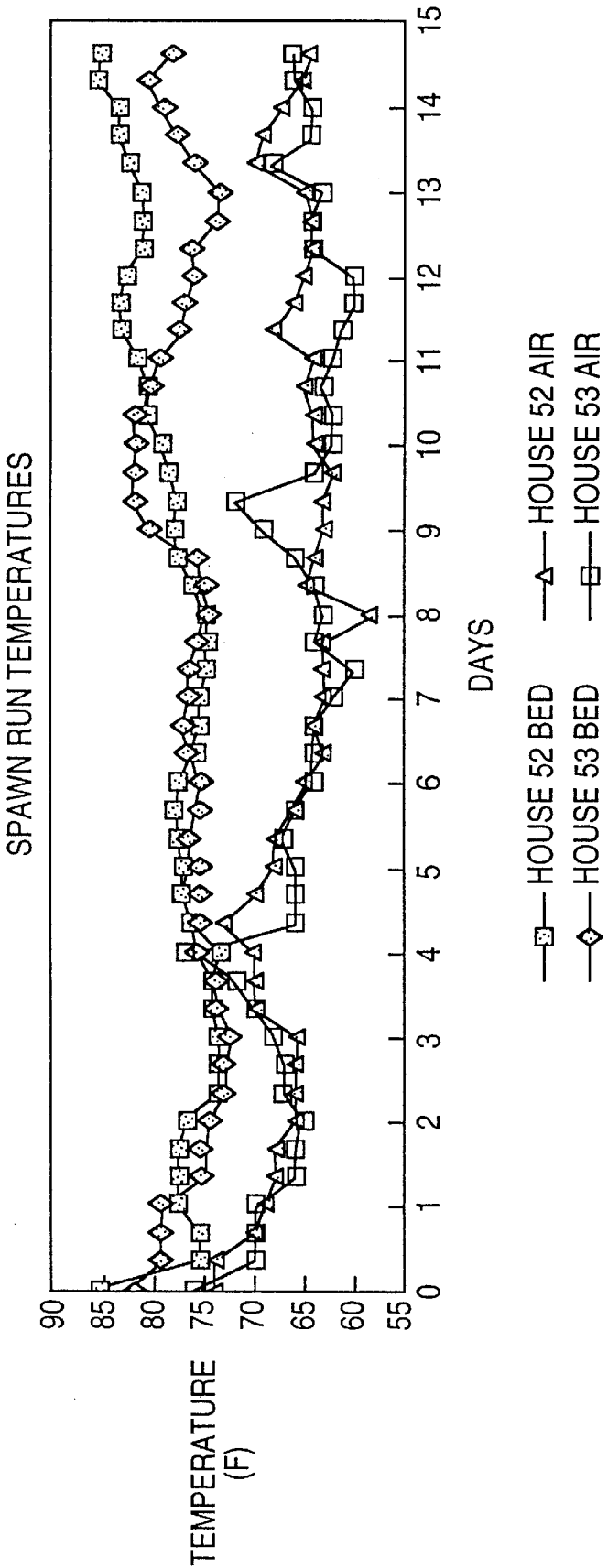
FIG. 4 shows the effects on spawn run compost temperature of a standard rye spawn plus S44 supplement and a spawn-supplement (formula 80).

Spawn run temperatures for houses 52 (rye spawn plus supplement) and 53 (spawn-supplement formula 80) are shown in FIG. 4. Although this test was conducted in July, 1997, house 53, which contained 3,000 lb of formula 80 spawn supplement, did not show excessive spawn run temperatures. The average compost temperature during spawn run was 76.8° F., with a maximum temperature of 82° F. Even with a mechanical problem on day 9 that caused an increase in spawn run temperature, the crop was easy to control. Use of the standard rye spawn/S44 supplement combination resulted in an average compost temperature of 78.3° F. and a maximum temperature of 85.3° F. Despite the higher spawning rate with the spawn-supplement formula, compost temperatures were lower.

Example 3

| Formula 68 | |
|---|---|
| Rye Grain | 27.8 g |
| Corn Gluten (60% protein) | 27.8 g |
| Paper Pellets | 27.8 g |
| Vermiculite | 8.3 g |
| CaCO$_3$ | 8.3 g |
| Water | 75 ml |
| Formula 78 | |
| Rye grain | 23.1 g |
| Corn Gluten (60% protein) | 17.0 g |
| Paper pellets | 23.1 g |
| Wheat Bran | 23.1 g |
| Vermiculite | 6.9 g |
| CaCO$_3$ | 6.9 g |
| Water | 73.7 ml |

The nitrogen content of formula 68 is 4.16%, while the nitrogen content of formula 78 is 3.53%. Formulas 68 and 78 spawn-supplements were prepared essentially as described previously. This trial was conducted at the same facility as described for example 1. Four trays were inoculated with 3% rye spawn, strain M466, and were amended with 4% S44 supplement (S44 is heated, cracked soybeans treated with a hydrophobic coating and mold inhibitory composition). Four trays were spawned with 4% spawn-supplement formula 68. Four trays were inoculated with 4% spawn-supplement formula 78. Four trays were inoculated with 4% spawn-supplement formula 78 and amended with 3% S44 supplement. Standard mushroom growing procedures were used throughout this test. Mushrooms were first harvested 15 days after casing.

Mycelial growth was rated as good for formula 68, formula 78, and formula 78 plus S44 after 6 days. After 15 days of spawn run, spawn growth was rated as excellent for the same 3 treatments. Growth of the rye spawn/S44 trays were rated as fair to good after 15 days. Very light growth of a mucoraceous fungus was observed on trays with rye spawn/S44 supplement and the formula 68 spawn supplement after 4 days. No growth of mold was observed on the formula 78 and formula 78/S44 spawn combinations at any time. One tray from each of treatments 1, 2, and 4 were infected with Trichoderma, and were discarded. Yield data for this trial are summarized in Table 4.

TABLE 4

Mushroom yield data (in lb/ft$^2$).

| SPAWN | 1$^{ST}$ BREAK | 2$^{ND}$ BREAK | 3$^{RD}$ BREAK | TOTAL |
|---|---|---|---|---|
| 3% RYE & 4% S44 | 1.87 A | 1.34 A | 1.02 A B | 4.23 A |
| 4% FORMULA 68 | 2.00 A | 1.82 A | 1.14 A B | 4.96 A |
| 4% FORMULA 78 | 2.11 A | 1.69 A | 1.16 A | 4.96 A |
| 4% 78 & 3% S44 | 1.80 A | 1.61 A | 0.79 B | 4.20 A |

Columns with the same letter are not significantly different at the 95% confidence level.

Figure 5:
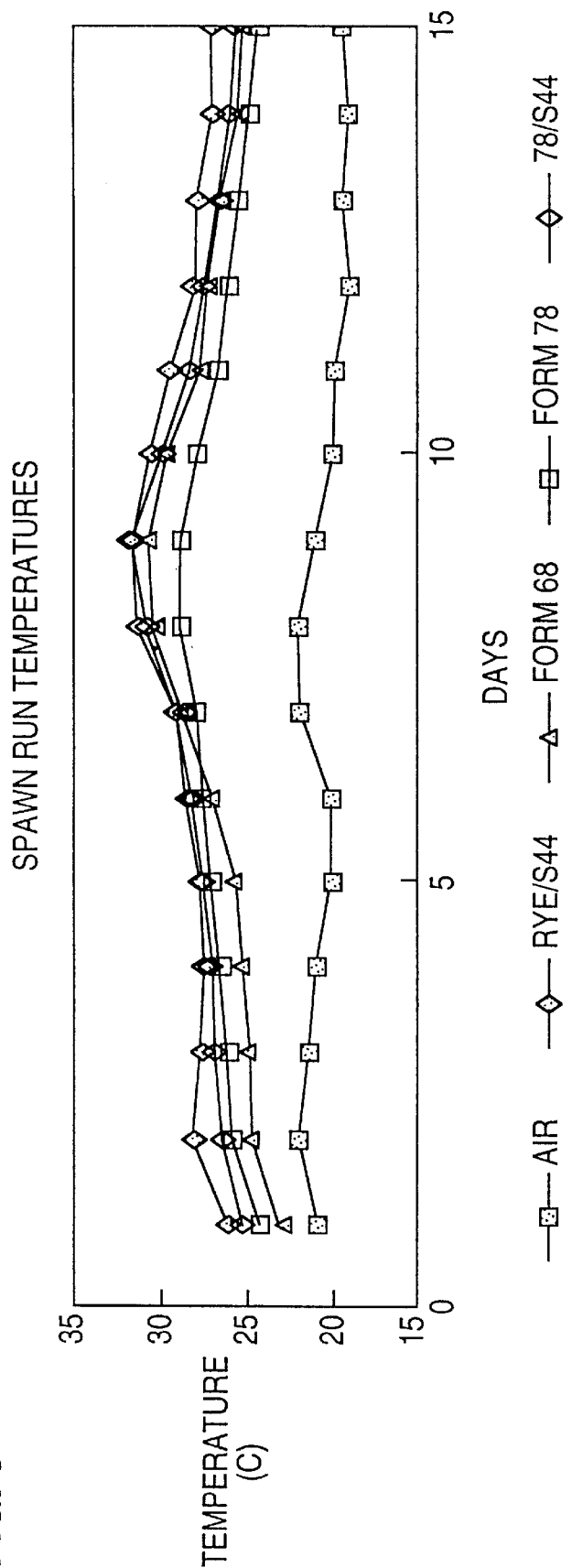
FIG. 5 shows the effects on spawn run compost temperature of a standard rye spawn plus S44 supplement and a spawn-supplement (formulas 68 and 78).

Although not statistically significant, the formula 68 spawn-supplement combination yielded 0.73 lb/ft$^2$ more than the standard rye spawn plus standard supplement combination. Also not statistically significant, the formula 78 spawn-supplement also yielded 0.73 lb/ft$^2$ more than the standard rye spawn plus standard supplement combination. Interestingly, the formula 78 spawn-supplement gave a reduced yield when amended with 4% S44 supplement. Use of the 4% supplementation rate may add too much nutrient to the compost and result in an inhibition of *Agaricus bisporus* growth or increase in the growth of competitor microorganisms that could not be detected visually. Temperature data from this test are summarized in FIG. 5. Spawn Run temperatures are consistently higher for the rye spawn plus S44 supplement combination. FIG. 5 shows the spawn run temperatures.

Example 4

Spawn-supplement formula 80 (as described in example 2) was prepared as described for example 1. Approximately 3,000 lb of this spawn-supplement was shipped to a "Dutch style" mushroom farm, in which phase II composting is carried out in bulk in pasteurization tunnels. Spawn is mixed with compost as it is transported to bulk spawn run tunnels. Supplement is typically added to compost as it is being transported to fixe d beds at the casing stage of the process. Three successive rooms comprised this test. Room 6 was spawn ed with 1,800 lb rye spawn and supplemented (at casing) with 1,800 lb S44 supplement. Room 19 was spawned with 2,920 lb spawn-supplement formula 80. Room 8 was spawned with 1,680 lb rye spawn and supplemented (at casing) with 1,400 lb SF48 supplement. The SF48 supplement consists of full fat soybean fines treated with an anti microbial coating. Its performance i s equivalent to S41 and S44. Note that although these rooms were spawned sequentially, the room numbers reflect the location on the farm, not spawning order. Yield data for this trial are as follows:

TABLE 5

Mushroom yield data (lb/ft$^2$)

| ROOM | SPAWN | 1$^{ST}$ BREAK | 2$^{ND}$ BREAK | 3$^{RD}$ BREAK | TOTAL |
|---|---|---|---|---|---|
| 6 | RYE/S44 | 3.16 | 1.61 | .05 | 4.82 |
| 19 | SS 80 | 2.86 | 1.40 | 1.04 | 5.30 |
| 8 | RYE/SF48 | 2.76 | 2.13 | 0.00* | 4.89 |

*Third break in room 8 was lost due to "Bubble" disease caused by Verticillium infection.

Although the mushroom yield increase in room 19 is not statistically significant due t o the low number of replicates, the yield of 5.30 lb/ft$^2$ is substantially higher than in adjacent rooms. While detailed compost temperature data are not available for this test, mushroom farm personnel noted the absence of a "heat surge" in room 19. A peak in compost temperature is typically noted around days 8 to 10 of spawn run when a nutrient supplement is added to compost. This surge was absent in room 19. This example also shows a very favorable mushroom production pattern. Lower first break production is more than compensated by the increased second and third break yields.

Example 5

Spawn-supplement formula 80 (see example 2) was prepared essentially as described previously, and tested in a pilot plant trial as described in example 1. Four 4'×3' trays were spawned with 3% rye spawn and supplemented with 4% S41 supplement (treatment 1). Four trays were spawned with 5% spawn-supplement formula 80 (treatment 2). Four trays were spawned with 6% spawn-supplement formula 80 (treatment 3). Four trays were spawned with 7% spawn-supplement formula 80 (treatment 4). Normal mushroom growing procedures were followed throughout this trial. Yield data are summarized in Table 6.

TABLE 6

Mushroom yield data (lb/ft$^2$)

| SPAWN | 1$^{ST}$ BREAK | 2$^{ND}$ BREAK | 3$^{RD}$ BREAK | TOTAL |
|---|---|---|---|---|
| RYE/S41 | 1.55 A | 1.94 A | 1.03 A | 4.52 A |
| 5% FORMULA 80 | 1.41 A | 1.68 A | 1.07 A | 4.16 A |
| 6% FORMULA 80 | 1.50 A | 1.84 A | 0.99 A | 4.33 A |
| 7% FORMULA 80 | 1.53 A | 1.90 A | 1.14 A | 4.57 A |

Columns with the same letter are not significantly different at the 95% confidence level.

Figure 6:
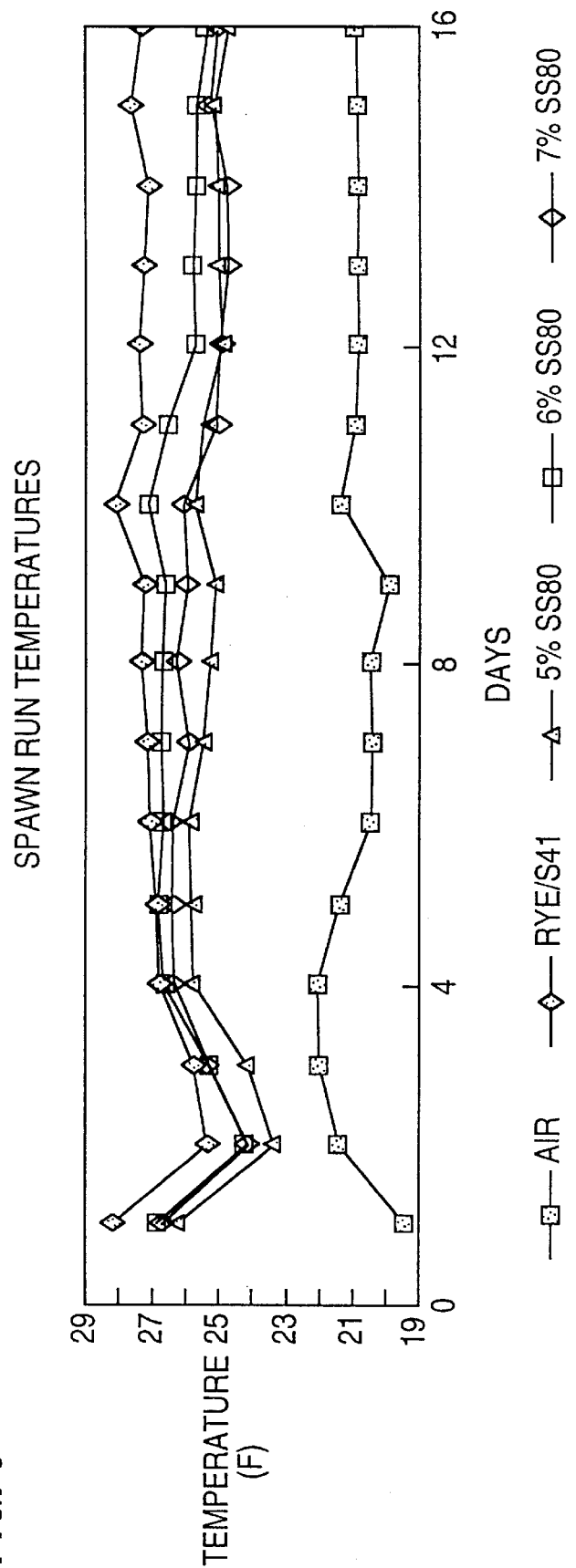
FIG. 6 shows the effects on spawn run compost temperature of a standard rye spawn plus S41 supplement and varying rates of spawn-supplement formula 80.
Figure 7:
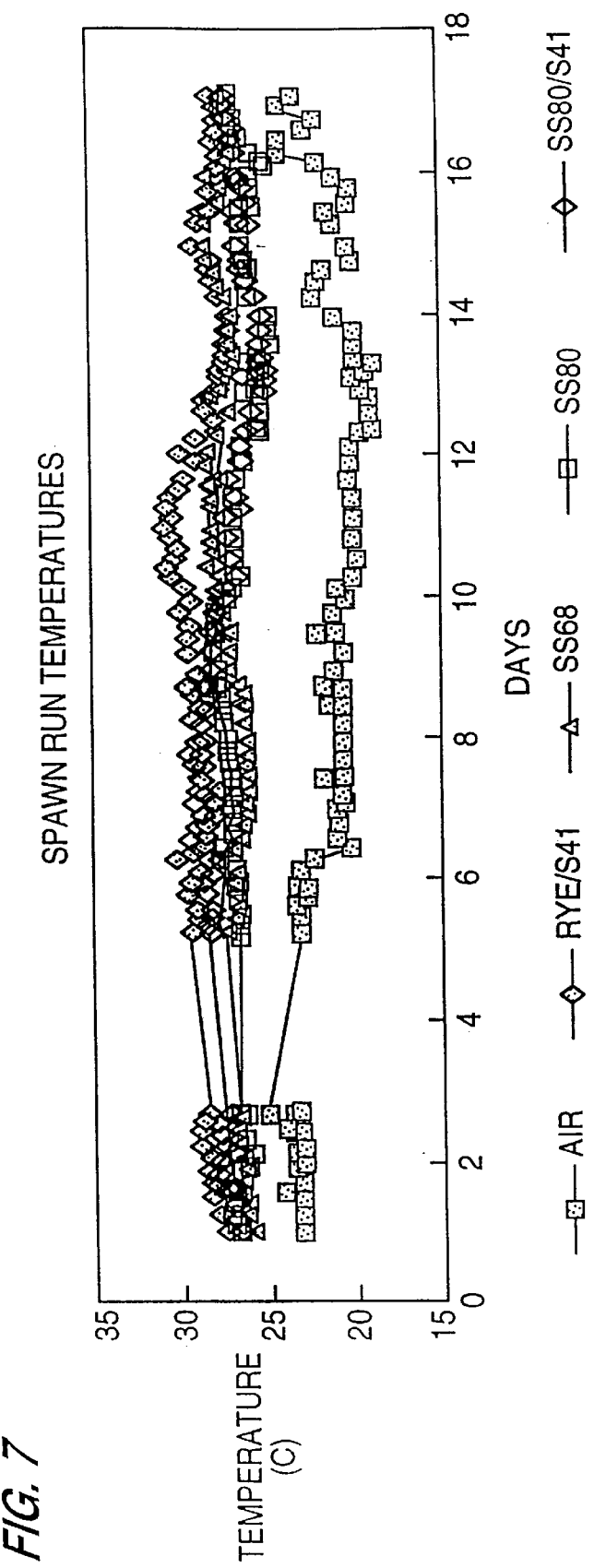
FIG. 7 shows the effects on spawn run compost temperature of a standard rye spawn plus 4% S41 supplement, spawn-supplement formula 68, spawn-supplement formula 80, and spawn-supplement formula 80 plus 2% S41 supplement.

This trial shows that no statistically significant differences in mushroom yield occur with spawn-supplement levels between 5 and 7% of the dry weight of the compost. This and other trials suggest that the optimum spawning rate with spawn-supplement is around 4 to 5%. Temperature data from this trial are summarized in FIG. 6.

All spawn-supplement treatments showed lower spawn run compost temperatures than the standard rye spawn plus supplement combination. Mold growth (Mucor and Penicillium) was observed on trays spawned with rye spawn plus S41 supplement. No mold growth was observed on any trays inoculated with spawn-supplement. Mold growth observations are consistent with temperature data. Spawn run was visually determined to be complete by day 10 of spawn run for trays inoculated with spawn-supplement. Trays inoculated with rye spawn plus supplement required about 15 days to complete spawn run.

Example 6

Spawn-supplement formula 68 (example 3) and formula 80 (example 2) were prepared essentially as described previously, and were tested for mushroom yield effects as described in example 1. Four trays were inoculated with 3% rye spawn plus 4% S41 supplement. Four trays were inoculated with 5% spawn-supplement formula 68. Four trays were inoculated with 5% spawn-supplement formula 80. Four trays were inoculated with 5% spawn-supplement formula 80 and supplemented with 2% S41 supplement. Normal mushroom growing practices were followed through out this test. Yield data are summarized in Table 7.

TABLE 7

Mushroom yield data (lb/ft$^2$)

| SPAWN | 1$^{ST}$ BREAK | 2$^{ND}$ BREAK | 3$^{RD}$ BREAK | TOTAL |
|---|---|---|---|---|
| 3% RYE/4% S41 | 1.93 B | 1.23 A | 0.70 A B | 3.86 B |
| 5% FORMULA 68 | 2.08 B | 1.14 A | 0.76 A | 3.98 B |
| 5% FORMULA 80 | 2.06 B | 1.19 A | 0.57 B | 3.83 B |
| 5% FORMULA 80/ 2% S41 | 2.68 A | 1.19 A | 0.60 B | 4.46 A |

Columns with the same letter are not significantly different at the 95w% confidence level.

No significant differences in mushroom yield are observed between the standard rye spawn plus supplement combination, spawn-supplement formula 68, and spawn-supplement formula 80. However, when the spawn-supplement formula 80 is amended with 2% S41 supplement, the mushroom yield is increased by 0.63 lb/ft$^2$. Clearly the 5% spawn-supplement plus 2% S41 supplement combination results in an improved productivity over unsupplemented spawn-supplement and the standard rye spawn plus 4% S41 supplement. Temperature data for this trial show that the highest spawn run compost temperatures were observed in trays with rye spawn and 4% S41 supplement FIG. 6). Addition of 2% S41 to the spawn-supplement formula 80 trays did not result in a substantial increase in spawn run compost temperature compared with unsupplemented formula 80 trays. Mold growth (Aspergillus) was observed on trays spawned with rye spawn and S41 supplement. A few spots of Neurospora mold were observed on trays spawned with spawn-supplement formula 68. No other mold growth was observed on trays inoculated with spawn-supplement. Spawn run for trays inoculated with formula 80 spawn-supplement was visually determined to be complete by day 12 of spawn run. Trays inoculated with formula 68 spawn-supplement completed spawn run in 14 days. Trays inoculated with rye spawn plus supplement required 14 days to complete spawn run.

Example 7

Spawn-supplement formula 83 colonized with *Agaricus bisporus* strain M473 was prepared as described previously and was shipped to a farm which has experienced green mold disease. At the time of the test, each 3,200 ft$^2$ house had an average of 50 spots of green mold by the time of first break. In two houses for which data are available, house 1 showed one spot of green mold, while house 2 showed no green mold infection sites. Green mold infection is substantially reduced in houses spawned with spawn-supplement formula 83.

Example 8

| Formula 83b | Grams |
|---|---|
| Corn Gluten | 30.2 |
| Paper Pellets | 14.5 |
| Calcined Earth | 29.1 |
| Feather Meal | 17.4 |
| CaCO$_3$/CaSO$_4$ (1:1) | 8.7 |
| Water | 75.6 |
| % Nitrogen (Calc) | 6.39% |
| % Moisture (Calc) | 48.23% |

Example 9

| Formula 80b | Grams |
|---|---|
| Corn Gluten | 30.3 |
| Paper Pellets | 22.4 |
| Vermiculite | 19.4 |
| Calcined Earth | 18.8 |
| CaCO$_3$/CaSO$_4$ (1:1) | 9.1 |
| Water | 78.8 |
| % Nitrogen (Calc) | 3.54% |
| % Moisture (Calc) | 48.78% |

Example 10

| Formula 80c-2 | Grams |
|---|---|
| Corn Gluten (60%) | 8 |
| Paper Pellets | 33.6 |
| Vermiculite | 32.8 |
| Calcined Earth | 13.6 |
| CaCO$_3$ | 12 |
| Water | 80 |
| % Nitrogen (Calc) | 1.38% |
| % Moisture (Calc) | 48.64% |

Example 11

| Formula 80c-16 | Grams |
|---|---|
| Corn Gluten (60%) | 63.5 |
| Paper Pellets | 13.3 |
| Vermiculite | 13.0 |
| Calcined Earth | 5.4 |
| CaCO$_3$ | 4.8 |
| Water | 73.0 |
| % Nitrogen (Calc) | 7.01% |
| % Moisture (Calc) | 48.12% |

Example 12

| Formula 80d | Grams |
|---|---|
| Corn Gluten (60%) | 33.3 |
| Paper Pellets | 22.4 |
| Vermiculite | 18.2 |
| Calcined Earth | 17.0 |
| CaCO$_3$ | 9.1 |

Example 13

| Formula 80d | Grams |
|---|---|
| Water | 78.8 |
| % Nitrogen (Calc) | 3.87% |
| % Moisture (Calc) | 48.89% |

Example 13

| Formula 80d-4 | Grams |
|---|---|
| Corn Gluten (60%) | 78.4 |
| Paper Pellets | 7.3 |
| Vermiculite | 5.9 |
| Calcined Earth | 5.5 |
| $CaCO_3$ | 2.9 |
| Water | 72.5 |
| % Nitrogen (Calc) | 8.57% |
| % Moisture (Calc) | 48.37% |

Example 14

| Formula 80d-4 | Grams |
|---|---|
| Feather Meal (80%) | 69.4 |
| Paper Pellets | 10.3 |
| Vermiculite | 8.3 |
| Calcined Earth | 7.8 |
| $CaCO_3$ | 4.2 |
| Water | 72.2 |
| % Nitrogen (Calc) | 10.10% |
| % Moisture (Calc) | 48.01% |

Example 15

| Formula 80e-7 (P55) | Grams |
|---|---|
| Linseed Meal | 51.1 |
| Paper Pellets | 15.7 |
| Vermiculite | 13.2 |
| Calcined Earth | 13.6 |
| $CaCO_3$ | 6.4 |
| Water | 74.5 |
| % Nitrogen (Calc) | 3.63% |
| % Moisture (Calc) | 48.66% |

Example 16

| Formula 83 (P57) | Grams |
|---|---|
| Corn Gluten | 30.3 |
| Paper Pellets | 22.4 |
| Calcined Earth | 20.0 |
| Feather Meal | 18.2 |
| $CaCO_3$ | 9.1 |
| Water | 78.8 |
| % Nitrogen (Calc) | 6.58% |
| % Moisture (Calc) | 48.78% |

Example 17

| Formula 83-C5 (P57) | Grams |
|---|---|
| Cottonseed Waste | 30.3 |
| Paper Pellets | 22.4 |
| Calcined Earth | 20.0 |
| Feather Meal | 18.2 |
| $CaCO_3$ | 9.1 |
| Water | 78.8 |
| % Nitrogen (Calc) | 4.69% |
| % Moisture (Calc) | 48.78% |

Example 18

| Formula 83-s5 (P59) | Grams |
|---|---|
| Whole Soybeans | 51.1 |
| Paper Pellets | 15.7 |
| Calcined Earth | 14.0 |
| Feather Meal | 12.8 |
| $CaCO_3$ | 6.4 |
| Water | 76.6 |
| % Nitrogen (Calc) | 6.03% |
| % Moisture (Calc) | 48.74% |

Example 19

| Formula 83-c3 (P59) | Grams |
|---|---|
| Cottonseed Meal | 46.5 |
| Paper Pellets | 17.2 |
| Calcined Earth | 15.3 |
| Feather Meal | 14.0 |
| $CaCO_3$ | 7.0 |
| Water | 76.7 |
| % Nitrogen (Calc) | 6.48% |
| % Moisture (Calc) | 48.66% |

Example 20

| Formula 83-c4 (P59) | Grams |
|---|---|
| Ground Corn | 54.5 |
| Paper Pellets | 13.5 |
| Calcined Earth | 12.0 |
| Feather Meal | 14.5 |
| $CaCO_3$ | 5.5 |
| Water | 76.4 |
| % Nitrogen (Calc) | 3.61% |
| % Moisture (Calc) | 48.74% |

Example 21

| Formula 83-sh2 (P61) | Grams |
|---|---|
| Soybean Hulls | 30.3 |
| Paper Pellets | 22.4 |
| Calcined Earth | 20.0 |
| Feather Meal | 18.2 |
| $CaCO_3$ | 9.1 |

-continued

| Formula 83-sh2 (P61) | Grams |
|---|---|
| Water | 78.8 |
| % Nitrogen (Calc) | 3.94% |
| % Moisture (Calc) | 48.78% |

Example 22

| Formula P69-1 | Grams |
|---|---|
| Feather Meal | 16.5 |
| Corn Gluten | 24.8 |
| Calcined Earth | 33.9 |
| Paper Pellets | 16.5 |
| $CaCO_3$ | 8.3 |
| Water | 78.4 |
| % Nitrogen (Calc) | 5.58% |
| % Moisture (Calc) | 48.23% |

Example 23

| Formula P69-2 | Grams |
|---|---|
| Feather Meal | 24.8 |
| Corn Gluten | 16.5 |
| Calcined Earth | 33.9 |
| Paper Pellets | 16.5 |
| $CaCO_3$ | 8.3 |
| Water | 78.4 |
| % Nitrogen (Calc) | 6.09% |
| % Moisture (Calc) | 48.23% |

Example 24

| Formula P71-3 | Grams |
|---|---|
| Peanut Hulls | 53.6 |
| Paper Pellets | 8.9 |
| Calcined Earth | 17.9 |
| Feather Meal | 14.3 |
| $CaCO_3$ | 5.4 |
| Water | 75.0 |
| % Nitrogen (Calc) | 3.61% |
| % Moisture (Calc) | 48.12% |

Example 25

| Formula P71-4 | Grams |
|---|---|
| Bone Meal | 55.6 |
| Paper Pellets | 9.3 |
| Calcined Earth | 18.5 |
| Feather Meal | 11.1 |
| $CaCO_3$ | 5.6 |
| Water | 75.9 |
| % Nitrogen (Calc) | 3.53% |
| % Moisture (Calc) | 48.48% |

Example 26

| Formula P73-w4 | Grams |
|---|---|
| Wheat Flour | 55.6 |
| Paper Pellets | 9.3 |
| Calcined Earth | 18.5 |
| Feather Meal | 11.1 |
| $CaCO_3$ | 5.6 |
| Water | 75.9 |
| % Nitrogen (Calc) | 3.69% |
| % Moisture (Calc) | 48.48% |

Example 27

| Formula P73-cs4 | Grams |
|---|---|
| Corn Starch | 50.0 |
| Paper Pellets | 8.3 |
| Calcined Earth | 16.7 |
| Feather Meal | 20.0 |
| $CaCO_3$ | 5.0 |
| Water | 76.7 |
| % Nitrogen (Calc) | 3.50% |
| % Moisture (Calc) | 48.45% |

Example 28

| Formula P73-bf4 | Grams |
|---|---|
| Barley Flour | 53.6 |
| Paper Pellets | 8.9 |
| Calcined Earth | 17.9 |
| Feather Meal | 14.3 |
| $CaCO_3$ | 5.4 |
| Water | 73.2 |
| % Nitrogen (Calc) | 3.59% |
| % Moisture (Calc) | 47.59% |

Example 29

| Formula P83-cf8 | Grams |
|---|---|
| Corn Flour | 62.5 |
| Paper Pellets | 6.3 |
| Calcined Earth | 12.5 |
| Feather Meal | 15.0 |
| $CaCO_3$ | 3.8 |
| Water | 75.0 |
| % Nitrogen (Calc) | 3.61% |
| % Moisture (Calc) | 48.40% |

Example 30

| Formula P75-yc4 | Grams |
|---|---|
| Yellow Corn Meal | 43.5 |
| Paper Pellets | 10.9 |
| Calcined Earth | 21.7 |
| Feather Meal | 17.4 |
| $CaCO_3$ | 6.5 |

Example 31

| Formula P75-yc4 | Grams |
|---|---|
| Water | 78.0 |
| % Nitrogen (Calc) | 3.69% |
| % Moisture (Calc) | 48.66% |

Example 32

| Formula P75-bc4 | Grams |
|---|---|
| Blue Cornmeal | 43.5 |
| Paper Pellets | 10.9 |
| Calcined Earth | 21.7 |
| Feather Meal | 17.4 |
| CaCO$_3$ | 6.5 |
| Water | 78.0 |
| % Nitrogen (Calc) | 3.79% |
| % Moisture (Calc) | 48.66% |

Example 33

| Formula P75-rf4 | Grams |
|---|---|
| Rye Flour | 53.6 |
| Paper Pellets | 8.9 |
| Calcined Earth | 17.9 |
| Feather Meal | 14.3 |
| CaCO$_3$ | 5.4 |
| Water | 75.0 |
| % Nitrogen (Calc) | 3.63% |
| % Moisture (Calc) | 48.12% |

Example 34

| Formula P75-pm2 | Grams |
|---|---|
| Peanut Meal | 29.4 |
| Paper Pellets | 14.7 |
| Calcined Earth | 29.4 |
| Feather Meal | 17.6 |
| CaCO$_3$ | 8.8 |
| Water | 79.4 |
| % Nitrogen (Calc) | 5.72% |
| % Moisture (Calc) | 48.62% |

| Formula P87-rf | Grams |
|---|---|
| Rye Flour | 64.1 |
| Paper Pellets | 6.4 |
| Calcined Earth | 12.8 |
| Feather Meal | 12.8 |
| CaCO$_3$ | 3.8 |
| Water | 74.4 |
| % Nitrogen (Calc) | 3.58% |
| % Moisture (Calc) | 48.28% |

Example 35

| Formula P87-wf | Grams |
|---|---|
| Wheat Flour | 63.4 |
| Paper Pellets | 7.6 |
| Calcined Earth | 15.2 |
| Feather Meal | 9.1 |
| CaCO$_3$ | 4.6 |
| Water | 76.2 |
| % Nitrogen (Calc) | 3.58% |
| % Moisture (Calc) | 48.83% |

Example 36

| Formula P87-bf | Grams |
|---|---|
| Barley Flour | 64.1 |
| Paper Pellets | 6.4 |
| Calcined Earth | 12.8 |
| Feather Meal | 12.8 |
| CaCO$_3$ | 3.8 |
| Water | 74.4 |
| % Nitrogen (Calc) | 3.53% |
| % Moisture (Calc) | 48.28% |

Example 37

| Formula P87-yc | Grams |
|---|---|
| Yellow Corn Meal | 51.7 |
| Paper Pellets | 8.6 |
| Calcined Earth | 17.2 |
| Feather Meal | 17.2 |
| CaCO$_3$ | 5.2 |
| Water | 75.9 |
| % Nitrogen (Calc) | 3.76% |
| % Moisture (Calc) | 48.29% |

Example 38

| Formula P87-bc | Grams |
|---|---|
| Blue Corn Meal | 58.8 |
| Paper Pellets | 7.4 |
| Calcined Earth | 14.7 |
| Feather Meal | 14.7 |
| CaCO$_3$ | 4.4 |
| Water | 76.5 |
| % Nitrogen (Calc) | 3.57% |
| % Moisture (Calc) | 48.72% |

Example 39

| Formula P89-83b | Grams |
|---|---|
| Feather Meal | 20.0 |
| Corn Gluten | 30.0 |
| Calcined Earth | 20.0 |
| Paper Pellets | 20.0 |
| CaCO$_3$ | 10.0 |

-continued

| Formula P89-83b | Grams |
|---|---|
| Water | 77.9 |
| % Nitrogen (Calc) | 6.80% |
| % Moisture (Calc) | 48.40% |

Example 40

| Formula P89-83b-3 | Grams |
|---|---|
| Feather Meal | 20.0 |
| Corn Gluten | 30.0 |
| Calcined Earth | 20.0 |
| Paper Pellets | 16.6 |
| CaCO$_3$ | 10.0 |
| Enhanced Oat Fiber | 3.4 |
| Water | 71.1 |
| % Nitrogen (Calc) | 6.99% |
| % Moisture (Calc) | 48.24% |

Formula S41: greater than 95% cracked soybeans with preservative coatings. Cracked soybeans are dehulled, cracked, and screened to retain a ca. 30 mg fraction. "Soybean fines" are what is left over after the cracked soybeans are removed.

REFERENCES

Chang, S. T. & W. A. Hayes. 1978. The Biology and Cultivation of Edible Mushrooms. Academic Press, New York. 819 pp.

Chang, S. T. & P. G. Miles. 1989. Edible Mushrooms and Their Cultivation. CRC Press. Boca Raton, Fla. 345 pp.

Elliott, T. J. 1985. Spawn-making and Spawns. Chapter 8, Pages 131–139, In: Flegg, P. B., D. M. Spencer, & D. A. Wood. The Biology and Technology of the Cultivated Mushroom. John Wiley & Sons, Ltd. Chichester.

Fermor, T. R., P. E. Randle, & J. F. Smith. 1985. Compost as a Substrate and its Preparation. Chapter 6, Pages 81–109, In: Flegg, P. B., D. M. Spencer, & D. A. Wood. The Biology and Technology of the Cultivated Mushroom. John Wiley & Sons, Ltd. Chichester.

Flegg, P. B., D. M. Spencer, & D. A. Wood. 1985. The Biology and Technology of the Cultivated Mushroom. John Wiley & Sons, Ltd. Chichester. 347 pp.

Fletcher, J. T. 1997. Mushroom Spawn and the Development of Trichoderma Compost Mold. Mushroom News 45:6–11.

Fritsche, G. 1978. "Breeding Work." Chapter 10, pages 239–250, In: Chang, S. T. & W. A. Hayes, Eds. "The Biology and Cultivation of Edible Mushrooms." Academic Press, NY.

Lemke, G. 1971. Erfahrungen mit Perlite bei der Myzelanzucht und Fruchtkorperproduktion des Kulturchampgnons Agaricus bisporus (Lge.) Sing. Gartenbauwissenschaft 1:19–27.

Van Griensven, L. J. L. D. 1988. "The Cultivation of Mushrooms." Darlington Mushroom Laboratories, Ltd. Russington, Sussex, England. 515 pp.

It will be apparent to those skilled in the art that various modifications and variations can be made in the methods and apparatus of the present invention without departing from the spirit or scope of the invention. Thus, it is intended that the present invention cover the modifications and variations of this invention provided they come within the scope of the appended claims and their equivalents.

What is claimed is:

1. A mushroom spawn-supplement comprising a mixture of: (a) at least one proteinaceous ingredient in an amount to provide in the mushroom spawn-supplement at least 3.5% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; and colonized with Agaricus bisporus mycelium wherein the (b) paper pellets, (c) particulate material, or both are present in an amount effective to provide at least 25,000 particles per 100 g of finished product.

2. The mushroom spawn-supplement of claim 1 wherein the proteinaceous ingredient is selected from the group consisting of corn gluten, feather meal, cracked soybeans, soybean meal, cottonseed meal, and mixtures thereof.

3. The mushroom spawn-supplement of claim 2 wherein the proteinaceous ingredient is corn gluten.

4. The mushroom spawn-supplement of claim 1 further comprising at least one oleaginous ingredient.

5. The mushroom spawn-supplement of claim 4 wherein the oleaginous ingredient is selected from the group consisting of cracked soybeans, soybean fines, sunflowers, cracked sunflowers, and corn oil.

6. The mushroom spawn-supplement of claim 1 wherein the particulate materials are selected from the group consisting of calcined earth, vermiculite, perlite, and mixtures thereof.

7. The mushroom spawn-supplement of claim 1 further comprising (f) gypsum in an amount effective to reduce clumping.

8. The mushroom spawn-supplement of claim 1 comprising on a dry weight basis: 5 to 80 wt % of the proteinaceous ingredient, 2 to 30 wt % of the paper pellets, 5 to 60 wt % of the particulate material, 1 to 12 wt % CaCO$_3$, and between 40 and 54% water.

9. The mushroom spawn-supplement of claim 8 further comprising 1 to 10 wt % CaSO$_4$.

10. The mushroom spawn-supplement of claim 8 comprising 6 to 9 wt % CaCO$_3$.

11. The mushroom spawn-supplement of claim 1 wherein 80% of the paper pellets have a size of between about 0.85 and 4.75 mm.

12. The mushroom spawn-supplement of claim 5 further comprising 1 to 50 wt % grain.

13. The mushroom spawn-supplement of claim 1 wherein the moisture content is between about 46 and 52%.

14. The mushroom spawn-supplement of claim 13 wherein the moisture content is between about 48 and 50%.

15. The mushroom spawn-supplement of claim 1 wherein the proteinaceous ingredients are present in an amount to provide between about 6 and 6.5% nitrogen on a dry weight basis.

16. The mushroom spawn-supplement of claim 1 wherein the buffer is calcium carbonate.

17. The mushroom spawn-supplement of claim 1 wherein the pH is between 6.2 and 7.4.

18. Mushroom compost comprising between 1 and 8% of fresh weight mushroom spawn-supplement of claim 1 based on the dry weight of the compost.

19. The mushroom compost of claim 18 comprising between 4 and 5% of fresh weight of the mushroom spawn-supplement.

20. The mushroom compost of claim 18 further comprising 1 to 6 wt % additional mushroom supplements.

21. The mushroom compost of claim 20 further comprising about 2 wt % additional mushroom supplements.

22. A method of reducing or eliminating mold comprising inoculating the compost with the spawn-supplement of claim 1.

23. The method of claim 22 wherein the mold is green mold disease.

24. A method of preparing spawn-supplement comprising colonizing a mixture of: (a) at least one proteinaceous ingredient in an amount to provide in the spawn-supplement at least 3.5% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; with *Agaricus bisporus* mycelium wherein the (b) paper pellets, (c) particulate material, or both are present in an amount effective to provide at least 25,000 particles per 100 g of finished product.

25. The method of claim 24 further comprising (f) gypsum in an amount effective to reduce clumping.

26. The method of claim 24 wherein the (b) paper pellets, (c) particulate material, or both are present in an amount effective to provide at least 40,000 particles per 100 g of finished product.

27. The method of claim 24 wherein the buffer is calcium carbonate.

28. The method of claim 24 wherein the pH is between 6.2 and 7.4.

29. The mushroom spawn-supplement of claim 1 wherein the (b) paper pellets, (c) particulate material, or both are present in an amount effective to provide at least 40,000 particles per 100 g of finished product.

30. A mushroom spawn-supplement comprising a mixture of: (a) at least one proteinaceous ingredient in an amount to provide in the mushroom spawn-supplement at least 1% nitrogen on a dry weight basis; (b) 2 to 30 wt % based on dry weight of paper pellets; (c) 5 to 60 wt % based on dry weight of at least one particulate material; (d) a buffer in an amount effective to provide a pH of about 6 to 7.8; and (e) water; and colonized with *Agaricus bisporus* mycelium wherein the (b) paper pellets, (c) particulate material, or both are present in an amount effective to provide at least 25,000 particles per 100 g of finished product.

31. The mushroom spawn-supplement of claim 30 further comprising (f) gypsum in an amount effective to reduce clumping.

32. The mushroom spawn-supplement of claim 30 wherein the buffer is calcium carbonate.

33. The mushroom spawn-supplement of claim 30 wherein the pH is between 6.2 and 7.4.

* * * * *